United States Patent
Horio et al.

(10) Patent No.: US 6,602,953 B1
(45) Date of Patent: Aug. 5, 2003

(54) POLYOXYMETHYLENE RESIN COMPOSITION

(75) Inventors: Mitsuhiro Horio, Kurashiki (JP); Yuuji Yoshinaga, Kurashiki (JP)

(73) Assignee: Asahi Kasei Kabushiki Kaisha

( * ) Notice: Subject to any disclaimer, the term of this patent is extended or adjusted under 35 U.S.C. 154(b) by 0 days.

(21) Appl. No.: 09/869,583

(22) PCT Filed: Oct. 27, 2000

(86) PCT No.: PCT/JP00/07574

§ 371 (c)(1),
(2), (4) Date: Jun. 29, 2001

(87) PCT Pub. No.: WO01/32775

PCT Pub. Date: May 10, 2001

(30) Foreign Application Priority Data

| Oct. 29, 1999 | (JP) | ............................................. 11-308788 |
| Nov. 8, 1999 | (JP) | ............................................. 11-317108 |
| Mar. 9, 2000 | (JP) | ......................................... 2000-064559 |

(51) Int. Cl.$^7$ ..................... C08G 63/48; C08G 63/91; C08L 51/08
(52) U.S. Cl. ............................. 525/63; 525/64; 525/69; 525/100; 525/106
(58) Field of Search ................... 525/69, 106, 100, 525/63, 64

(56) References Cited

U.S. PATENT DOCUMENTS 5,173,532 A   12/1992   Endo et al.

FOREIGN PATENT DOCUMENTS

| DE | 26 59 357 A1 | 7/1978 |
| GB | 1 590 549 | 3/1981 |
| JP | A9286899 | 11/1997 |

*Primary Examiner*—Jeffrey Mullis
(74) *Attorney, Agent, or Firm*—Birch, Stewart, Kolasch & Birch, LLP

(57) ABSTRACT

A polyoxymethylene resin composition is provided which comprises a polyoxymethylene resin (A), a silicone compound-grafted polyolefinic resin (B-1) and a silicone compound (B-2), the amount of the silicone compound-grafted polyolefinic resin (B1) being 0.05 to 10 parts by weight on the basis of 100 parts by weight of the polyoxymethylene resin (A), and the ratio of (B1)/(B2) by weight in the composition being 99/1 to 70/30.

15 Claims, No Drawings

US 6,602,953 B1

POLYOXYMETHYLENE RESIN COMPOSITION

This application is the national phase under 35 U.S.C. §371 of PCT International Application No. PCT/JP00/07574 which has an International filing date of Oct. 27, 2000, which designated the United States of America and was not published in English.

TECHNICAL FIELD

The present invention relates to a polyoxymethylene resin composition showing distinguished slidability (low coefficient of friction and low wear rate) without deteriorating the heat stability of the polyoxymethylene resin composition, when molded, and also showing a considerable improvement in thin-molding peeling insusceptibility, while preventing deterioration of slidability due to contact with a solvent, for example, for dry cleaning, etc. Moldings of the present polyoxymethylene resin composition are suitable for sliding components in precision devices, household electrical appliances, OA appliances, automobiles, industrial materials, sundry goods, etc.

BACKGROUND ART

Polyoxymethylene resins have been widely used not only in various mechanical working components, but also in OA appliances, etc. as an engineering resin showing balanced mechanical properties and a distinguished wear resistance, but just the mere distinguished resistance derived from the polyoxymethylene resin composition per se has not been found to be satisfactory for sliding materials. Thus, the sliding components molded from polyoxymethylene resin compositions have been so far used by greasing the sliding portions. The greasing step requires an additional working time and thus greaseless polyoxymethylene resin compositions have been so far keenly desired and several improvements have been proposed.

One of the improvement technologies is to add a silicone compound to a polyacetal resin. For example, JP-A-60-42449 discloses a composition having both friction wear resistance and antistatic effect endowed by adding to the polyacetal resin a dimethylpolysiloxane, some of whose side-chain methyl groups are modified into polyoxyalkylene-substituted alkyl groups; U.S. Pat. Nos. 4,874,807 and 4,879,331 disclose compositions prepared by adding a silicone oil having a specific viscosity to the polyacetal resin; JP-A-4-224856 discloses a composition comprising a polyacetal resin, a polyethylene wax and a silicone oil; JP-A-6-49322 discloses a composition comprising an oxymethylene block copolymer having a specific structure and polyorganosiloxane having a specific molecular weight; and JP-A-5-9362 discloses a composition comprising an oxymethylene block polymer having a specific structure and a silicone compound such as dimethylpolysiloxane or dimethylsiloxane, whose methyl groups are modified by hydrogen, an alkyl group, an aryl group, an ether group, etc.

Furthermore, combinations of a polyoxymethylene resin with an inorganic filler, a lubricant, etc. have been so far studied to improve the rigidity and friction wear resistance. For example, U.S. Pat. No. 4,645,785 discloses a composition comprising polyoxymethylene resin, wollastonite, N-hydroxymethylmelamine, silicone oil having a polycondensation degree of 10–5,000 and polyethylene having a molecular weight of 100,000–1,000,000 or a copolymer of ethylene and α-olefin, but the composition is not satisfactory with respect to the coefficient of friction and wear rate.

Still furthermore, the composition comprising polyoxymethylene resin and a silicone compound and the composition comprising polyoxymethylene resin, an inorganic filler and a silicone compound have a poor compatibility of the polyoxymethylene resin with the silicone compound, resulting in such a disadvantage as peeling occurrence in the gate region during the injection molding. Such a considerable peeling phenomenon appears particularly in the case of moldings having a thickness of 2 mm or less.

As a technology of improving the peeling insusceptibility of moldings made from a composition comprising a polyoxymethylene resin and a silicone compound, JP-A-11-279421 discloses a composition comprising a thermoplastic resin including a polyoxymethylene resin, a compatibilizing agent and a silicone gum or silicone rubber, but the composition has such a disadvantage as considerable deterioration in the heat stability of the polyoxymethylene resin due to use of an acid-modified compatibilizing agent, and no improvement effect on the molding peeling insusceptibility has been observed at all in the case of thin moldings.

As a technology of combining a polyoxymethylene resin with a silicone compound-grafted polyolefinic resin polymer, JP-A-4-146949 discloses a combination of a polyacetal resin with an organosiloxane-modified ethylene-ethyl acrylate copolymer. The technology is directed to an improvement in the impact resistance of an ethylene-ethyl acrylate resin by high level cross-linking of the resin with an organosiloxane to provide a rubber. As to the lubricating properties, it only discloses the lubricating properties proper to the polyacetal resin per se.

Still furthermore, the composition comprising a polyoxymethylene resin and a silicone compound has such a disadvantage that the slidability will be considerably deteriorated, when brought into contact with a solvent for dry cleaning, etc., because the silicone is washed away from the surface, and thus improvements of such a disadvantage have been desired in applications to fasteners, buckles, clips, etc., but no specific improvement technologies have been disclosed yet.

DISCLOSURE OF THE INVENTION

As a result of extensive studies on the aforementioned problems, the present inventors have found that a polyoxymethylene resin composition comprising polyoxymethylene resin (A), a specific amount, based on (A), of a silicone compound-grafted polyolefinic resin (B1) and a silicone compound (B2) shows a distinguished slidability (low coefficient of friction and low wear rate) as moldings without deteriorating the heat stability of the polyoxymethylene resin and also shows considerable improvement in the peeling insusceptibility when made into thin moldings, while preventing deterioration of slidability due to contact with a solvent for dry cleaning, etc. and have accomplished the present invention.

That is, the present invention relates to inventions of the following [1] to [17].

[1] A polyoxymethylene resin composition, which comprises a polyoxymethylene resin (A), a silicone compound-grafted polyolefinic resin (B1) and a silicone compound (B2), the amount of the silicone compound-grafted polyolefinic resin (B1) being 0.05 to 10 parts by weight on the basis of 100 parts by weight of the polyoxymethylene resin (A), and the ratio of (B1)/(B2) by weight being 99/1 to 70/30.

[2] A polyoxymethylene resin composition, which comprises a polyoxymethylene resin (A) and a polyolefinic resin composition (B) comprising a silicone compound-grafted polyolefinic resin (B1), obtained by a grafting reaction of a polyolefinic resin with a silicone compound in a graft ratio of the silicone compound to the polyolefinic resin of 95 to 30% by weight, and a silicone compound (B2), the amount of the silicone compound-grafted polyolefinic resin (B1) being 0.05 to 10 parts by weight on the basis of 100 parts by weight of the polyoxymethylene resin (A), and the ratio of (B1)/(B2) by weight being 99/1 to 70/30.

[3] The polyoxymethylene resin composition according to [2], which comprises a polyoxymethylene resin (A), a polyolefinic resin composition (B) comprising a silicone compound-grafted polyolefinic resin (B1), obtained by a grafting reaction of a polyolefinic resin with a silicone compound in a graft ratio of the silicone compound to the polyolefinic resin of 95 to 30% by weight, and a silicone compound (B2), and a silicone compound (B3), the ratio of (B1)/[total of (B2) and (B3)] by weight being 99/1 to 70/30.

[4] The polyoxymethylene resin composition according to any one of [1] to [3], wherein 0.05 to 5 parts by weight of a lubricant (C) and/or 0.5 to 100 parts by weight of an inorganic filler (D) are further contained on the basis of 100 parts by weight of the polyoxymethylene resin (A).

[5] The polyoxymethylene resin composition according to [2], wherein in the grafting reaction of the polyolefinic resin with the silicone compound the ratio of the polyolefinic resin to the silicone compound by weight is in the range of 80/20 to 20/80.

[6] The polyoxymethylene resin composition according to [1] or [2], wherein the polyolefinic resin is at least one resin selected from low density polyethylene, linear low density polyethylene, an ethylene-vinyl acetate copolymer, an ethylene-methyl methacrylate copolymer and an ethylene-ethyl acrylate copolymer, and the resin may contain a small amount of a vinyl monomer such as vinyl acetate, etc., if required.

[7] The polyoxymethylene resin composition according to [4], wherein the lubricant is at least one member selected from an alcohol, a fatty acid, an ester of an alcohol and a fatty acid, an ester of an alcohol and a dicarboxylic acid, a polyoxyalkylene glycol and an olefin compound having an average degree of polymerization of 10 to 500.

[8] The polyoxymethylene resin composition according to [4], wherein the inorganic filler is at least one member selected from fibrous, granular, plate-shaped and hollow fillers.

[9] A molding formed from the polyoxymethylene resin composition according to any one of [1] to [8].

[10] The molding according to [9], wherein the molding is at least one component selected from the group consisting of a mechanical working component, an outset chassis resin component, a chassis, a tray and a side plate.

[11] The molding according to [10], wherein the mechanical working component is at least one component selected from the group consisting of gears, cams, sliders, levers, arms, clutches, joints, shafts, bearings, key stems and key tops.

[12] The molding according to [9], wherein the molding is a component for OA appliances.

[13] The molding according to [9], wherein the molding is a component for video appliances.

[14] The molding according to [9], wherein the molding is a component for music, image and information appliances.

[15] The molding according to [9], wherein the molding is a component for communication appliances.

[16] The molding according to [9], wherein the molding is a component for automobile interior and exterior furnishings.

[17] The molding according to [9], wherein the molding is a component for industrial sundries.

BEST MODE FOR CARRYING OUT THE INVENTION

<Polyoxymethylene Resin>

The polyoxymethylene resin (A) for use in the present invention includes homopolymers obtained by polymerizing formaldehyde or cyclic oligomers of formaldehyde such as trioxane as its trimer, tetraoxane as its tetramer, etc. and terminated with ether or ester groups at both ends of the polymer; oxymethylene copolymers obtained by copolymerizing formaldehyde, trioxane as its trimer or tetraoxane as its tetramer with ethylene oxide, propylene oxide, 1,3-dioxolane, formal of glycol, formal of diglycol, etc.; those with branches of molecular chains; oxymethylene block copolymers containing not less than 50% by weight of segments consisting of oxymethylene units and not more than 50% by weight of different segments, etc. Oxymethylene block copolymers are preferably block copolymers of polyalkylene glycol and a polyoxymethylene homopolymer or block polymers of hydrogenated polybutadiene and an oxymethylene copolymer, as disclosed in JP-A-57-31918.

These polymers can be used alone or in combination thereof. Polyoxymethylene resin (A) of the present invention can be selected as desired, depending on this purpose. From the viewpoint of slidability, homopolymers having a high flexural modulus of elasticity or copolymers having a low comonomer content are preferable, whereas from the viewpoint of heat stability copolymers having a high comonomer content or block copolymers of hydrogenated polybutadiene and an oxymethylene copolymer are preferable.

The melt index MI of polyoxymethylene resin (A) for use in the present invention is preferably in a range of 1.0–100 g/10 min., more preferably 2.0–80 g/10 min. (as measured on the basis of ASTM-D1238-57T). Below 1.0 g/10 min., molding becomes difficult, whereas above 100 g/10 min. durability becomes unsatisfactory in some cases.

For the polyoxymethylene resin (A) of the present invention, stabilizers so far used in polyoxymethylene resins, for example, a heat stabilizer and a weater (light) resistant stabilizer can be used alone or in combination thereof.

Use of an antioxidant or a formaldehyde- or formic acid-trapping agent or simultaneous use thereof is effective as a heat stabilizer.

The antioxidant is preferably a hindered phenol-based antioxidant, which include, for example, n-octadecyl-3-(3', 5'-di-t-butyl-4'-hydroxyphenyl)-propionate, n-octadecyl-3-(3'-methyl-5'-t-butyl-4'-hydroxyphenyl)-propionate, n-tetradecyl-3-(3',5'-di-t-butyl-4'-hydroxyphenyl)-propionate, 1,6-hexanediol-bis-(3-(3,5-di-t-butyl-4-hydroxyphenyl)-propionate), 1,4-butanediol-bis-(3-(3,5-di-t-butyl-4-hydroxyphenyl)-propionate), triethyleneglycol-bis-(3-(3-t-butyl-5-methyl-4-hydroxyphenyl)-propionate), tetrakis-(methylene-3-(3',5'-di-t-butyl-4'-hydroxyphenyl)-propionatemethane, 3,9-bis(2-(3-(3-t-butyl-4-hydroxy-5-methylphenyl)propionyloxy)-1,1-dimethylethyl)-2,4,8,10-tetraoxaspiro(5,5)undecane, N,N'-bis-3-(3',5'-di-t-butyl-4-hydroxyphenol)propionylhexamethylenediamine, N,N'-tetramethylenebis-3-(3'-methyl-5'-t-butyl-4-hydroxyphenol) propionyldiamine, N,N'-bis-(3-(3,5-di-t-butyl-4-hydroxyphenol)propionyl)hydrazine, N-salicyloyl-N'-salicylidenehydrazine, 3-(N-salicyloyl)amino-1,2,4- triazole, N,N'-bis(2-(3-(3,5-di-butyl-4-hydroxyphenyl) propionyloxy)ethyl)oxyamide, etc. Among these hindered phenol-based antioxidants, triethyleneglycol-bis-(3-(3-t-butyl-5-methyl-4-hydroxyphenyl)-propionate) and tetrakis-(methylene-3-(3',5'-di-t-butyl-4'-hydroxyphenyl) propionatemethane are particularly preferable.

Formaldehyde or formic acid-trapping agents include, for example, (a) formaldehyde reactive nitrogen-containing compounds, (b) formaldehyde reactive nitrogen-containing polymers, and (c) hydroxides, inorganic acid salts, carboxylates, or alkoxides of alkali metals or alkaline earth metals.

The formaldehyde reactive nitrogen-containing compounds include, for example, (1) dicyandiamide, (2) amino-substituted triazines, (3) copolycondensates of amino-substituted triazine and formaldehyde, etc.

The amino-substituted triazines include, for example, guanamine (2,4-diamino-sym-triazine), melamine (2,4,6-triamino-sym-triazine), N-butylmelamine, N-phenylmelamine, N,N-diphenylmelamine, N,N-diallylmelamine, N,N',N''-triphenylmelamine, N-methylolmelamine, N,N'-dimethylolmelamine, N,N',N''-trimethylolmelamine, benzoguanamine (2,4-diamino-6-phenyl-sym-triazine), 2,4-diamino-6-methyl-sym-triazine, 2,4.-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-metcapto-sym-triazine, 2,4-dioxy-6-amino-sym-triazine (amelite), 2-oxy-4,6-diamino-sym-triazine(ameline), N,N',N'-tetracyanoethylbenzoguanamine, etc.

The copolycondensates of amino-substituted triazine and formaldehyde include, for example, polycondensates of melamine-formaldehyde, etc. Among them, dicyandiamide, melamine and polycondensates of melamine-formaldehyde are preferable.

Furthermore, the formaldehyde reactive nitrogen-containing polymers include, for example, (1) polyamide resins, (2) polymers obtained by polymerizing acrylamide and its derivative or acrylamide and its derivative with other vinyl monomers in the presence of a metal alcoholate, (3) polymers obtained by polymerizing acrylamide and its derivative or acrylamide and its derivative with other vinyl monomers in the presence of a radical polymerization catalyst, (4) polymers containing nitrogen groups such as amine, amide, urea, urethane, etc. and the like.

The polyamide resins include, for example, nylon 4-6, nylon 6, nylon 6-6, nylon 6-10, nylon 6-12, nylon 12, etc. and their copolymers such as nylon 6/6-6, nylon 6/6–6/6-10, nylon 6/6-12, etc.

The polymers obtained by polymerizing acrylamide and its derivative or acrylamide and its derivative with other vinyl monomers in the presence of a metal alcoholate include, for example, poly-β-alanine copolymers. These polymers can be prepared by any one of the processes disclosed in U.S. Pat. No. 5,015,707, JP-B-5-87096, JP-B-5-47568 and JP-A-3-234729.

The polymers obtained by polymerizing acrylamide and its derivative, or acrylamide and its derivative with other vinyl monomers in the presence of a radical polymerization catalyst can be prepared by a process as disclosed in U.S. Pat. No. 5,011,890.

The hydroxides, inorganic acid salts, carboxylates or alkoxides of alkali metals or alkaline earth metals include, for example, hydroxides of sodium, potassium, magnesium, calcium, barium or the like, and carbonates, phosphates, silicates, borates and carboxylates of the aforementioned metals. Carboxylic acids for the carboxylates are saturated or unsaturated aliphatic carboxylic acids having 10–36 carbon atoms, etc., and may be substituted by hydroxyl groups. The saturated aliphatic carboxylic acids include, for example, capric acid, lauric acid, myristic acid, palmitic acid, stearic acid, arachidic acid, behenic acid, lignoceric acid, cerotic acid, montanic acid, melissic acid and ceroplastic acid. Unsaturated aliphatic carboxylic acids include, for example, undecylenic acid, oleic acid, elaidic acid, cetoleic acid, erucic acid, brassidic acid, sorbic acid, linoleic acid, linolenic acid, arachidonic acid, propiolic acid, stearolic acid, etc. Alkoxides include, for example, methoxides, ethoxides, etc. of the aforementioned metals.

The weather (light) resistant stabilizer is preferably (a) benzotriazole-based compounds, (b) oxalanilide-based compounds and (c) hindered amine-based compounds.

The benzotriazole-based compounds include, for example, 2-(2'-hydroxy-5'-methylphenyl)-benzotriazole, 2-[2'-hydroxy-3,5-di-t-butylphenyl]-benzotriazole, 2-[2'-hydroxy-3,5-di-isoamylphenyl]-benzotriazole, 2-[2'-hydroxy-3,5-bis-(α,α-dimethylbenzyl)phenyl]-2H-benzotriazole, 2-(2'-hydroxy-4'-octoxyphenyl) benzotriazole, etc., preferably 2-[2'-hydroxy-3,5-bis(α,α-dimethylbenzyl)phenyl]-2H-benzotriazole and 2-[2'-hydroxy-3,5-di-t-butylphenyl]benzotriazole.

The oxalanilide-based compounds include, for example, 2-ethoxy-2'-ethyloxalic acid bisanilide, 2-ethoxy-5-t-butyl-2'-ethyloxalic acid bisanilide, 2-ethoxy-3'-dodecyloxalic acid bisanilide, etc. These compounds may be used alone or in combination of at least two thereof.

The hindered amine-based compounds include, for example, 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidyl)-carbonate, bis(2,2,6,6-tetramethyl-4-piperidyl)-oxalate, bis (2,2,6, 6-tetramethyl-4-piperidyl) -malonate, bis(2,2,6,6-tetramethyl-4-piperidyl)-sebacate, bis(2,2,6,6-tetramethyl-4-piperidyl)-adipate, bis(2,2,6,6-tetramethyl-4-piperidyl)-terephthalate, 1,2-bis(2,2,6,6-tetramethyl-4-piperidyloxy)-ethane, α,α'-bis(2,2,6,6-tetramethyl -4-piperidyloxy)-p-xylene, bis(2,2,6,6-tetramethyl-4-piperidyl)tolylene-2,4-dicarbamate, bis(2,2,6,6-tetramethyl-4-piperidyl)-hexamethylene-1,6-dicarbamate, tris(2,2,6,6-tetramethyl-4-piperidyl)-benzene-1,3,5-tricarboxylate, tris(2,2,6,6-tetramethyl-4-piperidyl)-benzene-1,3,4-tricarboxylate, etc., preferably bis(2,2,6,6-tetramethyl)-4-piperidyl-sebacate. The hindered amine-based compounds may be used alone or in combination of at least two thereof.

For the weather (light) resistant stabilizer, a combination of at least one of the benzotriazole-based compounds and the oxalanilide-based compounds with the hindered amine-based compound is most preferable.

<Silicone-grafted Polyolefinic Resin and Silicone Compounds>

Description will be made below of the silicone compound-grafted polyolefinic resin (B1) (which sometimes will be hereinafter referred to as "silicone-grafted polyolefinic resin") and a silicone compound (B2) contained in the present polyoxymethylene resin composition.

The silicone-grafted polyolefinic resin (B1) for use in the present invention is a polyolefinic resin preferably such as low density polyethylene, linear low density polyethylene, high density polyethylene, ethylene-vinyl acetate copolymer, ethylene-methyl methacrylate copolymer, ethylene-ethyl acrylate copolymer, polymethylpentene, polypropylene and tetrafluoroethylene-ethylene copolymer (which may contain a small amount of vinylic monomers such as vinyl acetate, if required) grafted with a silicone compound represented by the following formula (1), such as polydimethylsiloxane, etc.:

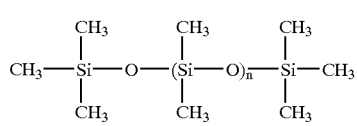
(1)

In formula (1), the methyl group ($CH_3$) may be substituted by hydrogen, an alkyl group, a phenyl group, an ether group or an ester group, or a substituent group containing a hydroxy group, an amino group, an epoxy group, a carboxyl group, a carbinol group, a methacryl group, a mercapto group, a phenol group, a vinyl group, an allyl group, a polyether group, a fluorine-containing alkyl group or the like as a reactive substituent group, where a substituent group containing a vinyl group or an allyl group, preferably a vinyl group is more preferable for the grafting. An average degree of polymerization n of the silicone compound is preferably in a range of 1,000 to 10,000. In case the average degree of polymerization n is less than 1,000 or more than 10,000, the slidability sometimes becomes unsatisfactory.

It is more preferable from the viewpoint of anti-electric content fouling property that the silicone compound represented by formula (1) has minimized contents of cyclic low molecular weight monomers and oligomers.

The silicone compound (B2) for use in the polyoxymethylene resin composition may be the same as or different from the silicone compound for use in the grafting of the polyolefinic resin, but preferably is a silicone compound (silicone gum) having no cross-linked structure as shown by formula (1). In the present invention, at least two kinds of the silicone compounds can be also used.

In the silicone-grafted polyolefinic resin (B-1) of the present invention, it is necessary that the polymer chains are not cross-linked one with another, but are present as independent polymer chains. Therefore, no such resins of cross-linked structure type (three-dimensional structure type) showing a rubbery elasticity due to cross-linking of main chains per se of silicone-grafted polyolefinic resin through the grafted silicone compounds are included in the present silicone-grafted polyolefinic resin.

As to amounts of the components in the polyoxymethylene resin composition, it is necessary that 0.05 to 10 parts by weight, preferably 0.2 to 5 parts by weight, of the silicone compound-grafted polyolefinic resin (B1) is added to 100 parts by weight of polyoxymethylene resin (A), while setting a ratio of the silicone-grafted polyolenic resin (B1) to the silicone compound (B2) (by weight) to 99/1 to 70/30.

When the amount of the silicone-grafted polyolefinic resin (B1) to be added is less than 0.05 parts by weight on the basis of 100 parts by weight of the polyoxymethylene resin (A), the effect on slidability improvement will not be satisfactory, whereas above 10 parts by weight the effect on improvement of the coefficient of friction is less but the wear rate will be increased and the peeling occurrence will be unpreferably considerable with moldings having a small thickness. When the ratio of (B1)/(B2) by weight is outside of the range of 99/1 to 70/30, the peeling insusceptibility and the slidability after the solvent washing will be deteriorated.

The silicone-grafted polyolefinic resin (B1) and the silicone compound (B2) can be independently added to the polyoxymethylene resin, but can be also added as a polyolefinic resin composition (B) comprising the silicone-grafted polyolefinic resin (B1) and the silicone compound (B2) to the polyoxymethylenne resin. That is, the present polyoxymethylene resin composition can be also obtained by adding the polyolefinic resin composition (B) to the polyoxymethylene resin (A).

The polyolefinic resin composition (B) can be obtained by a grafting reaction of a polyolefinic resin with a silicone compound, and the "silicone compound" contained in the resulting polyolefinic resin composition means a silicone compound that is not grafted with the polyolefinic resin after the grafting reaction. Thus, the amount of the silicone compound (B2) in the case of the polyoxymethylene resin composition obtained by adding the polyolefinic resin composition (B) to the polyoxymethylene resin (A) means an amount of the silicone compound that remains as ungrafted with the polyolefinic resin contained in the polyolefinic resin composition (B).

Furthermore, in the case that the polyolefinic resin composition (B) is added to the polyoxymethylene resin (A), it is necessary to set a graft ratio of the silicone compound to the polyolefinic resin of 95–30% by weight. That is, a specific amount of unreacted silicone compound, which has not undergone a grafting reaction with the polyolefinic resin, must remain in the polyolefinic resin composition.

This means that the "graft ratio" exerts an influence on the slidability of moldings obtained from the polyoxymethylene resin composition. In other words, the graft reaction of the polyolefinic resin with a silicone compound must be carried out in such a degree as not to deteriorate the slidability improvement effect of the moldings.

That is, in the case of polyolefinic resin compositions having a graft ratio of more than 95% by weight, it is usually necessary to use an organic peroxide in its preparation, and use of such an organic peroxide gives rise to a cross-linking reaction of the silicone-grafted polyolefins per se through the grafted silicone compounds, resulting in an adverse effect on the slidability of moldings prepared from the polyoxymethylene resin composition. When the graft ratio is less than 30% by weight, on the other hand, the amount of unreacted silicone compounds will be increased in the polyolefinic resin composition, resulting in deterioration of thin-molding peeling insusceptibility and also of slidability after solvent washing. In the present invention, the graft ratio is in a range of more preferably 90 to 40% by weight, most preferably 90 to 50% by weight.

The graft ratio can be determined, for example, by a dissolution test with a Soxhlet extractor using a solvent (e.g. aromatic hydrocarbons such as toluene, xylene, etc. or halogenated hydrocarbons). Specifically, "graft ratio" is a value (% by weight) obtained by subtracting the amount of the silicone compound unreacted with the polyolefinic resin and dissolved by extraction from the amount of the silicone compound added to the polyolefinic resin and dividing the remainder by the amount of the silicon compound as added.

Specifically, the present polyolefinic resin composition (B) can be obtained by graft polymerizing the aforementioned olefinic resin such as low density polyethylene, linear low density polyethylene, high density polyethylene, ethylene-vinyl acetate copolymer, ethylene-methyl methacrylate copolymer, ethylene-ethyl acrylate copolymer, polymethylpentene, polypropylene, tetrafluoroethylene-ethylene copolymer, etc. (which may contain a small amount of vinylic monomers such as vinyl acetate, etc., if required) with a silicone compound shown by the aforementioned formula (1) such as polydimethylsiloxane, etc. in a specific graft ratio.

The polyolefinic resin composition can be prepared, for example, by subjecting a polyolefinic resin and a silicone compound to melt kneading at a specific temperature under specific shearing conditions, as disclosed in U.S. Pat. No. 3,865,897. Similar technology is disclosed also in U.S. Pat. No. 4,252,915 and JP-A-1-230652. In the present invention, it is not preferable from the viewpoint of preventing cross-linking of silicone-grafted polyolefinic resin to use an organic peroxide during the melt kneading of the polyolefinic resin and the silicone compound, but so far as the graft ratio can be kept within the aforementioned range and no cross-linking structure is provided, a very small amount of an organic peroxide may be used.

The polyolefinic resin composition includes specifically such grades as SP-100, SP-110, SP-300, SP-310, SP-350, etc. commercially available from Dow-Corning Asia K.K. as silicone master pellets.

Furthermore, in the preparation of polyolefinic resin composition (B), the ratio of the polyolefinic resin to the silicone compound in the silicone-grafted polyolefinic resin is in a range of preferably 80/20 to 20/80 (by weight), more preferably 70/30 to 30/70 (by weight). When the ratio by weight of the polyolefinic resin exceeds 80, the slidability improvement effect will be unpreferably lower, whereas when the ratio by weight of the silicone compound exceeds 80, the preparation will be harder to make and also it is unpreferably difficult to keep the graft ratio of silicone compound within the aforementioned range.

Still furthermore, the present polyoxymethylene resin composition can be obtained by adding the aforementioned polyolefinic resin composition (B) to the polyoxymethylene resin (A) and then adding a silicone compound (B3) thereto. The silicone compound (B3) does not mean the silicone compound used in the grafting reaction of the polyolefinic resin, but means unreacted silicone compound newly added to the polyoxymethylene resin composition.

In the case of obtaining the polyoxymethylene resin composition by adding the polyolefinic resin composition (B) and the silicone compound (B3) to the polyoxymethylene resin (A), it is preferable from the viewpoints of slidability and peeling insusceptability of moldings that the mixing proportion of the silicone compound (B3) to be newly added, i.e. the ratio of (silicone-grafted polyolefinic resin (B1) in polyolefinic resin composition (B))/(silicone compound (B2) in polyolefinic resin composition (B)+ silicone compound (B3)) is in a range of 99/1 to 70/30 (by weight).

For the silicone compound (B3) to be newly added, the same silicone compounds as those shown by the aforementioned formula (1) can be used. It is possible that the compound (B3) is not substituted by allyl groups or vinyl groups, because no grafting reaction of the polyolefinic resin is required any more. The procedure for the addition is not particularly limited.

Thus, the present polyoxymethylene resin composition includes not only a polyoxymethylene resin composition, which comprises the polyoxymethylene resin (A) and the polyolefinic resin composition (B) comprising the silicone compound-grafted polyolefinic resin (B1) obtained by-graft reaction of a polyolefinic resin with a silicone compound and the silicone compound (B2), but also a polyoxymethylene resin composition, which comprises the polyoxymethylene resin (A), the polyolefinic resin composition (B) comprising the silicone compound-grafted polyolefinic resin (B1) obtained by a grafting reaction of a polyolefinic resin with a silicone compound and the silicone compound (B2), and the silicone compound (B3) (which is not the silicone compound used in the grafting reaction of the polyolefinic resin, but is an unreacted silicone compound newly added to-the polyoxymethylene resin composition).

The silicone-grafted polyolefinic resin (B1) (which comprises, if the polyoxymethylene resin composition contains a lubricant (C), the silicone-grafted polyolefinic resin (B1) and the lubricant (C)) exists as a dispersed phase in the polyoxymethylene resin composition and the dispersed particle sizes are preferably not more than 50 $\mu$m, more preferably not more than 30 $\mu$m, most preferably not more than 15 $\mu$m. Dispersed particle sizes exceeding 50 $\mu$m are not preferable, because the surface appearances of moldings will be deteriorated and the slidability will fluctuate greatly.

It is also possible to add the silicone-grafted polyolefinic resin (B1) as a master batch with the polyoxymethylene resin (A) or other resins in advance (the amount of the silicone-grafted polyolefinic resin in the master batch is in a range of preferably 5 to 70% by weight, more preferably 10 to 50% by weight).

<Lubricant>

The present lubricant (C) is at least one compound selected from alcohols, fatty acids, esters of alcohols with fatty acids, esters of alcohols with dicarboxylic acids, polyoxyalkyleneglycols and olefin compounds having an average degree of polymerization of 10 to 500.

Any of monohydric and dihydric alcohols can be used for the alcohols. Monohydric alcohols include saturated and unsaturated alcohols such as octyl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, oleyl alcohol, nonadecyl alcohol, eicosyl alcohol, ceryl alcohol, behenyl alcohol, melissyl alcohol, hexyldecyl alcohol, octyldodecyl alcohol, decylmyristyl alcohol, decylstearyl alcohol, unilin® alcohol, etc.

Polyhydric alcohols include, for example, ethylene glycol, diethylene glycol, triethylene glycol, propylene glycol, dipropylene glycol, butanediol, pentanediol, hexanediol, glycerin, diglycerin, triglycerin, threitol, erythritol, pentaerythritol, arabitol, ribitol, xylitol, sorbite, sorbitan, sorbitol and mannitol.

Fatty acids include, for example, caproic acid, enanthic acid, caprylic acid, pelargonic acid, capric acid, undecylic acid, lauric acid, tridecylic acid, myristic acid, pentadecylic acid, palmitic acid, pentadecylic acid, stearic acid, nonadecanoic acid, arachic acid, behenic acid, lignoceric acid, cerotic acid, heptacosanoic acid, montanic acid, mellisic acid, lacceric acid, undecylenoic acid, oleic acid, elaidic acid, cetoleic acid, erucic acid, brassidic acid, sorbic acid, linoleic acid, linolenic acid, arachidonic acid, propiolic acid and stearolic acid. Natural fatty acids containing such members or their mixtures can be also used. These fatty acids may be substituted by a hydroxyl group. Furthermore, synthetic fatty acids such as a terminally carboxyl-modified synthetic fatty alcohol, can be also used.

Esters of alcohols and fatty acids are esters of the following alcohols and fatty acids. Any of monohydric and polyhydric alcohols can be used for the alcohols. Monohydric alcohols include saturated and unsaturated alcohols such as methyl alcohol, ethyl alcohol, propyl alcohol, butyl alcohol, amyl alcohol, hexyl alcohol, heptyl alcohol, octyl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, oleyl alcohol, nonadecyl alcohol, eicosyl alcohol, ceryl alcohol, behenyl alcohol, melissyl alcohol, hexyldecyl alcohol, octyldodecyl alcohol, decylmyristyl alcohol, decylstearyl alcohol, unilin alcohol, etc. Polyhydric alcohols include those having 2 to 6 carbon atoms such as ethylene glycol, diethylene glycol, triethylene glycol, propylene glycol, dipropylene glycol, butanediol, pentanediol, hexanediol, glycerin, diglycerin, triglycerin, pentaerythritol, arabitol, ribitol, xylitol, sorbite, sorbitan, sorbitol, wannitol, etc.

Fatty acids include caproic acid, enanthic acid, caprylic acid, pelargonic acid, capric acid, undecylic acid, lauric acid, tridecylic acid, myristic acid, pentadecylic acid, palmitic acid, pentadecylic acid, stearic acid, nonadecanoic acid, arachic-acid, behenic acid, lignoceric acid, cerotic acid, heptacosanic acid, montanic acid, melissic acid, lacceric acid, undecylenbic acid, oleic acid, elaidic acid, cetoleic acid, erucic acid, brassidic acid, sorbic.:acid, linoleic acid, linolenic acid, arachidonic acid, propiolic acid, stearolic acid, etc. Natural fatty acids containing such members or their mixture can be also used. These fatty acids may be substituted by a hydroxyl group. Furthermore, synthetic fatty acids such as a terminally carboxyl-modified synthetic fatty alcohol, can be also used.

Among these alcohols, fatty acids and esters of alcohols and fatty acids, esters of fatty acids having at least 12 carbon atoms and alcohols are preferable. More preferable are esters of fatty acids having at least 12 carbon atoms and alcohols having at least 10 carbon atoms. Most preferable are esters of fatty acids having 12 to 30 carbon atoms and alcohols having 10 to 30 carbon atoms.

Esters of alcohols and dicarboxylic acids include monoesters and diesters of saturated and unsaturated primary alcohols such as octyl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, oleyl alcohol, nonadecyl alcohol, eicosyl alcohol, ceryl alcohol, behenyl alcohol, melissyl alcohol, hexyldecyl alcohol, octyldodecyl alcohol, decylmyristyl alcohol, decylstearyl alcohol, unilin alcohol, etc. and dicarboxylic acids such as oxalic acid, malonic acid, succinic acid, glutaric acid, adipic acid, pimelic acid, suberic acid, azelaic acid, sebacic acid, undecenoic acid, brassidic acid, maleic acid, fumaric acid, glutaconic acid, etc., and mixtures thereof. Among these esters of alcohols and dicarboxylic acids, esters of alcohols having at least 10 carbon atoms and dicarboxylic acids are preferable.

Polyoxyalkyleneglycols include 3 kinds of compound groups.

First group includes polycondensates of alkyleneglycols as monomers such as polyethyleneglycol, polypropyleneglycol, block polymers of ethyleneglycol and propyleneglycol, etc. Their polymerization degree is in a range of preferably 5 to 1,000, more preferably 10 to 500.

Second group includes ether compounds of the first group and aliphatic alcohols such as polyethyleneglycol oleyl ether (ethylene oxide polymerization mole number: 5-50), polyethyleneglycol cetyl ether (ethylene oxide polymerization mole number: 5-50), polyethyleneglycol stearyl ether (ethylene oxide polymerization mole number: 5-30), polyethyleneglycol lauryl ether (ethylene oxide polymerization mole number: 5-30), polyethyleneglycol tridecyl ether (ethylene oxide mole number: 5-30), polyethyleneglycol nonylphenyl ether (ethylene oxide polymerization number: 2-100), polyethyleneglycol octylphenyl ether (ethylene oxide polymerization mole number: 4-50), etc.

Third group includes ester compounds of the first group and higher fatty acids such as polyethyleneglycol monolaurate (ethylene oxide polymerization mole number: 2-30), polyethyleneglycol monostearate (ethylene oxide polymerization mole number: 2-50), polyethyleneglycol monoleate (ethylene oxide polymerization mole number: 2-50), etc.

Among the present lubricants (C), olefin compounds having an average degree of polymerization of 10 to 500 are those represented by the following formula (2):

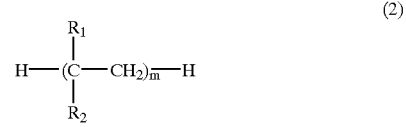

where $R_1$ and $R_2$ are independently selected from the group consisting of hydrogen, an alkyl group, an aryl group and an ether group where the average degree of polymerization m is 10 to 500, and where the alkyl group includes, for example, ethyl, propyl, butyl hexyl, octyl, decyl, lauryl, cetyl, stearyl, etc.; the aryl group includes, for example, phenyl, p-butylphenyl, p-octylphenyl, p-nonylphenyl, benzyl, p-butylbenzyl, tolyl, xylyl, etc.; and the ether group includes, for example, ethylether, propylether, butylether, etc.

Olefin compound-constituting monomers include, specifically, olefinic monomers such as ethylene, propylene, 1-butene, 2-butene, isobutylene, 1-pentene, 2-pentene, 4-methylpentene, 2-methyl-1-butene, 3-methyl-1-butene, 2-methyl-2-butene, 1-hexene, 2,3-dimethyl-2-butene, 1-heptene, 1-octene, 1-nonene, etc., and diolefinic monomers such as allene, 1,2-butadiene, 1,3-butadiene, 1,3-pentadiene, 1,4-pentadiene, 1,5-hexadiene, cyclopentadiene, etc. Compounds obtained by copolymerization of at least two of these olefinic monomers and diolefinic monomers can be also used. In the case that the olefinic compounds are compounds obtained by polymerization of diolefinic monomers, it is preferable from the viewpoint of heat stability improvement to use olefin compounds with minimized unsaturated carbon-carbon bonds by the ordinary hydrogenation process.

Average degree of polymerization m of the olefin compound-constituting olefin units is in a range of preferably 10 to 500, more preferably 15 to 300, most preferably 15 to 100. Average degree of polymerization m of less than 10 is not preferable, because the long-term slidability will be lowered and an adverse effect will be given to the mold fouling prevention, whereas m of more than 500 is also not preferable, because the initial slidability will be largely lowered.

The mixing proportion of lubricant to be added is 0.05 to 5 parts by weight, preferably 0.1 to 4 parts by weight, more preferably 0.2 to 3 parts by weight, on the basis of 100 parts by weight of polyoxymethylene resin. A mixing proportion of less than 0.05 parts by weight is not preferable, because the slidability improvement effect will be unsatisfactory, whereas a mixing proportion of more than 5 parts by weight is also not preferable, because the wear rate will be increased and the peeling insusceptibility will be deteriorated.

It is also possible to use the lubricant as a master batch in the aforementioned silicone-grafted polyolefinic resin.

<Inorganic Filler>

Inorganic filler (D) for use in the present invention includes fibrous, granular, plate-like and hollow fillers. Fibrous fillers include, for example, inorganic fibers such as glass fibers, asbestos fibers, carbon fibers, silica fibers, silica-alumina fibers, zirconia fibers, boron nitride fibers, silicon nitride fibers, boron fibers, potassium titanate fibers, and metal fibers of, e.g. stainless steel, aluminum, titanium, copper, brass, etc., and further includes short-fiber whiskers of potassium titanate, zinc oxide, titanium oxide, etc., and also acicular wollastonite (calcium silicate). Granular fillers include, for example, carbon black, silica, quartz powder, glass beads, glass powders, aluminum silicate, kaolin, talc, clay, diatomaceous earth, nepheline syenite, cristobalite, wollastonite (calcium silicate), iron oxide, titanium oxide, alumina, calcium sulfate, barium sulfate, calcium carbonate, magnesium carbonate, dolomite, calcium phosphate, hydroxyapatite, silicon carbide, silicon nitride, boron nitride, various metal powders, etc. Plate-like fillers include mica, glass flakes, and various metal foils. Hollow fillers include glass balloons, silica balloons, Shirasu balloons, metallic balloons, etc. These fillers can be used alone or in combinations of at least two thereof.

Any of surface-treated and surface-untreated fillers can be used for the fillers, but surface-treated fillers are sometimes preferable from the view-point of surface flatness and mechanical properties of moldings. Known surface-treating agents can be used. For example, various coupling-treating agents of the silane series, titanate series, aluminum series, zirconium series, etc. can be used, and include, for example, N-(2-aminoethyl)-3-aminopropyl-triethoxysilane, 3-glycidoxypropyltrimethoxysilane, isopropyltris-stearoyl titanate, diisopropoxyammonium ethyl acetate, n-butyl zirconate, etc.

Particle sizes and amounts of these fillers depend on the uses and objects of the individual fillers and thus are not particularly restricted, but can be set forth in view of their uses and objects as follows:

(1) To Give Surface Appearance and Slidability to Moldings

It is preferable from the viewpoint of giving surface appearance and distinguished slidability to moldings to use inorganic fillers having particle sizes of not more than 100 $\mu$m in terms of volume average particle size, more preferably not more than 50 $\mu$m, most preferably not more than 30 $\mu$m. Specifically, potassium titanate whiskers, wollastonite (acicular and granular), calcium carbonate, talc, nepheline syenite, hydroxyapatite, silica, carbon black, and kaolin are preferable.. Particularly preferable are potassium titanate whiskers, wollastonite (acicular and granular), calcium carbonate, talc and carbon black.

(2) To Give Rigidity

It is preferable from the viewpoint of giving a high level of rigidity to moldings to use glass fibers, glass flakes, carbon fibers, mica, etc. Mixing proportion of these fillers is in a range of preferably 0.5 to 100 parts by weight, more preferably 2 to 80 parts by weight, on the basis of 100 parts by weight of the polyoxymethylene resin. Less than 0.5 parts by weight is not preferable, because the reinforcing effect of the filler will be not satisfactory, whereas more than 100 parts by weight is also not preferable, because the surface appearance will be poorer and the molding workability and impact resistance will be lowered.

The present polyoxymethylene resin composition can further contain various additives as used in the conventional polyoxymethylene resin compositions such as lubricants other than the aforementioned, impact resistance-improving agents, softening agents, crystal nucleating agents, mold-releasing agents, dyes, pigments, etc., if desired, within such a range as not to spoil the object of the present invention.

<Polyoxymethylene Resin Composition>

Ordinary melt kneaders can be used for a process for producing the present resin composition. Melt kneaders include, for example, a kneader, a roll mill, an uniaxial extruder, a biaxial extruder, a multiaxial extruder, etc. The working temperature for melt kneading is preferably 180° to 240° C. To maintain the quality and working surroundings, inert gas flushing or deaeration using a single stage venting or multi-stage venting is preferable.

<Moldings>

Moldings can be made from the present resin composition by a molding procedure such as injection molding, hot runner injection molding, outsert molding, insert molding, hollow injection molding, injection molding using a high-temperature mold by high frequency induction heating (Bright Surface Holding), compression molding, inflation molding, blow molding, extrusion molding, cutting of extrusion moldings, etc. The present moldings are preferably those made by injection molding for the reason of satisfying the properties required by the present invention.

The present moldings are suitable for the following uses:

Mechanical working components, typically gears, cams, sliders, levers, arms, clutches, felt clutches, idler gears, pulleys, rollers, rolls, key stems, key tops, shutters, reels, shafts, joints, axles, bearings, guides, etc.;

Outsert molding resin components and insert molding resin components;

Components for office automation appliances, typically chassis, trays, side plates, printers and copiers;

Components for cameras and video appliances, typically VTR (video tape recorder), video movies, digital video cameras, cameras, and digital cameras;

Components for music, image and information appliances, typically cassette players, DAT, LD (Laser Disk), MD (Mini Disk), CD (Compact disk) including CD-ROM (Read Only Memory), CD-R (Recordable) and CD-RW (Rewritable), DVD (Digital Video Disk) including DVD-ROM, DVD-R, DVD-RW, DVD-RAM (Random Access Memory and DVD-Audio), other optical disk drives, MFD, MO, navigation systems and mobile personal computers, and for communication appliances, typically portable telephones and facsimiles;

Electrical appliance components and electronic appliance components;

Automobile components such as fuel-related components, typically gasoline tanks, fuel pump modules, valves, gasoline tank flanges, etc., door-related components, typically door locks, door handles, window regulators, speaker grills, etc., sheet belt-related components, typically sheet belt slip rings, press buttons, etc., combination switch components and switch and clip components;

Mechanical pencil penpoints and mechanical working components for propelling or retracting mechanical pencil lead;

Sinks, drains and mechanical working components for putting a plug on or off a drain;

Door lock components for vending machines and mechanical working components for commodity product delivery;

Cord stoppers, adjusters and buttons for clothes;

Sprinkler nozzles and connection joints for sprinkler hoses;

Architectural components for step rails and flooring material supports; and

Industrial components, typically disposable cameras, toys, fasteners, chains, conveyors, buckles, sporting goods, vending machines, furniture, musical instruments and housing equipment.

EXAMPLES

The present invention will be described in detail below, referring to Examples. First of all, materials used in the Examples and Comparative Examples, and evaluation methods for the resulting polyoxymethylene resin compositions will be explained.

<Details of Materials Used>

A. Polyoxymethylene Resins

A-1: Polyoxymethylene copolymer containing 0.5 mol. % of 1,3-dioxolane as a copolymer component and having a flexural modulus of elasticity: 2.9 GPa and a melt index: 20 g/10 min. (ASTM D-1238-57T);

A-2: Polyoxymethylene copolymer containing 1.3 mol. % of 1,3-dioxolane as a copolymer component and having a flexural modulus of elasticity: 2.6 GPa and a melt index: 20 g/10 min. (ASTM D-1238-57T);

A-3: Polyoxymethylene homopolymer acetylated at both terminals and having a flexural modulus of elasticity: 3.0 GPa and a melt index: 20 g/10 min. (ASTM D-1238-57T);

A-4: Polyoxymethylene copolymer obtained by the following procedure:

Trioxane containing 4 ppm of water and formic acid in total and 1,3-dioxolane (cyclic formal) were fed to a polymerizer simultaneously at 40 moles/hr and 1 mole/hr, respectively, and $1 \times 10^{-5}$ mole of trifluoroboron-di-n-butyletherate dissolved in cyclohexane as a polymerization catalyst and $1 \times 10^{-3}$ mole of polybutadiene hydroxylated at both terminals (Mn=2330), represented by the following formula (3) as a chain transfer agent were continuously fed thereto each on the basis of one mole of trioxane and subjected to polymerization;

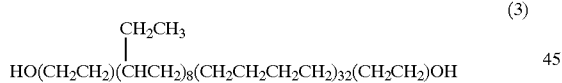

Polymers discharged from the polymerizer were put into an aqueous 1% triethylamine solution to completely deactivate the polymerization catalyst, and then the polymers were recovered by filtration and washed. Then, 20 wt. ppm of triethyl(2-hydroxyethyl)ammonium formate as a quaternary ammonium compound in terms of nitrogen was added to one part by weight of the crude polyoxymethylene copolymer resulting from the filtration and washing, followed by uniform mixing and drying at 120° C.

Then, 0.3 parts by weight of triethyleneglycol-bis-[3-(3-t-butyl-5-methyl-4-hydroxyphenyl)-propionate] as an antioxidant was added to 100 parts by weight of the dried crude polyoxymethylene copolymer, and the mixture was fed to a biaxial screw extruder with a vent. While adding water and/or triethylamine to the molten oxymethylene copolymer in the extruder, if required, decomposition of unstable terminals was carried out at an extruder temperature set to 200° C. for a residence time of 5 minutes. The polyoxymethylene copolymer decomposed at the unstable terminals was deaerated under reduced pressure of 21 kPa and extruded through the extruder dies as strands and pelletized by a cutter. The resulting polyoxymethylene copolymer was found to have Mn=62,000 by GPC molecular weight measurement and a melt index=20g/10 min. (ASTM D-1238-57T E), and A-5: Polyoxymethylene copolymer M90-44 made by Polyplastic K.K.

B. Polyolefinic Resin Compositions, etc. Obtained by Graft Reaction of a Polyolefinic Resin with a Silicone Compound B-1: Polyethylene resin composition comprising silicone compound-grafted polyethylene resin, obtained by melt kneading 36 g of low density polyethylene containing 5 wt. % of vinyl acetate and having a melt index MI of 5 g/10 min. (ASTM D1238-57T) and 24 g of a silicone compound represented by the following formula (4), using a Labo-Plastomill (made by Toyo Seiki K.K.) at a temperature of 180° C. and 60 rpm for 20 minutes, and a silicone compound. Graft ratio of the silicone compound determined by a procedure as will be described later was found to be 90 wt. %. The ratio of silicone compound-grafted polyethylene resin to silicone compound was 96.0/4.0 (by weight):

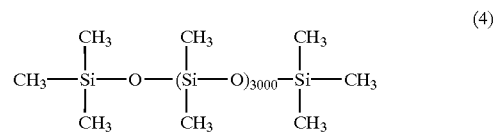

(where the silicone compound of formula (4) is a xylene-soluble polyorganosiloxane, 4 moles of whose methyl groups are substituted by dimethylvinyl groups on the basis of 100 moles of silicon atoms).

[Determination of Graft Ratio]

1. Make a polyolefinic resin composition obtained by a grafting reaction of polyolefinic resin with a silicone compound into a film form by compression molding (film thickness: 0.2–0.3 mm).

2. Extract with a Soxhlet extractor (solvent: xylene, temperature: 140° C. and time: 8 hours).

3. Obtain a graft ratio by the following formula.

$$\frac{\text{Amount of added silicone compound} - \text{Amount of extracted silicone compound}}{\text{Amount of added silicone compound}} \times 100$$

B-2: Resin composition comprising silicone compound-grafted polyethylene resin, obtained by melt kneading 36 g of the same low density polyethylene as in B-1 and 24 g of silicone compound represented by the same formula (4) as in B-1, using a Labo-plastomill at a temperature of 180° C. and 60 rpm for 15 minutes, and a silicone compound. Graft ratio of the silicone compound determined by the aforementioned procedure was 70 wt. %. The ratio of silicone compound-grafted polyethylene resin to silicone compound was 88.0/12.0 (by weight).

B-3: Resin composition comprising silicone compound-grafted polyethylene resin, obtained by melt kneading 36 g of the same low density polyethylene as in B-1 and 24 g of silicone compound represented by the aforementioned formula (4), using a Labo-Plastomill at a temperature of 180° C. and 60 rpm for 10 minutes, and a silicone compound. Graft ratio of the silicone compound determined by the aforementioned procedure was 50 wt. %. The ratio of silicone compound-grafted polyethylene resin to silicone compound was 80.0/20.0 (by weight).

B-4: Resin composition comprising silicone compound-grafted polyethylene resin, obtained by melt kneading 36 g of the same low density polyethylene as in B-1 and 24 g of silicone compound represented by the aforementioned formula (4), using a Labo-Plastomill at a temperature of 160° C. and 60 rpm for 10 minutes, and a silicone compound. Graft ratio of the silicone compound determined by the aforementioned procedure was 20 wt. %. The ratio of silicone compound-grafted polyethylene resin to silicone compound was 68.0/32.0 (by weight).

B-5: Resin composition comprising silicone compound-grafted polyethylene resin, obtained by melt kneading 30 g of linear low density polyethylene having a melt index MI=4 g/10 min. and 30 g of a silicone compound represented by the following formula (5), using a Labo-Plastomill at a temperature of 210° C. and 60 rpm for 30 minutes, and a silicone compound. Graft ratio of the silicone compound determined by the aforementioned procedure was 83 wt. %. The ratio of silicone compound-grafted polyethylene resin to silicone compound was 91.5/8.5 (by weight):

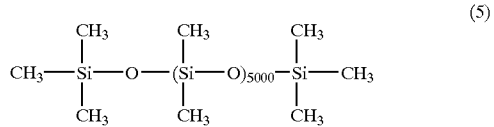
(5)

(where the silicone compound of formula (5) is a xylene-soluble polyorganosiloxane, 3 moles of whose methyl groups are substituted by dimethylvinyl groups on the basis of 100 moles of silicon atoms).

B-6: Resin composition comprising silicone compound-grafted ethylene-methyl methacrylate copolymer, obtained by melt kneading 30 g of ethylene-methyl methacrylate copolymer containing 5 wt. % of methyl methacrylate and having a melt index MI=5 g/10 min. and 30 g of a silicone compound of the same formula (5) as in B-5, using a Labo-Plastomill at a temperature of 180° C. and 60 rpm for 20 minutes, and a silicone compound. Graft ratio of the silicone compound determined by the aforementioned procedure was 80 wt. %. The ratio of silicone compound-grafted ethylene-methyl methacrylate copolymer to silicone compound was 90.0/10.0 (by weight).

B-7: Polydimethylsiloxane having an average degree of polymerization n=5,000, represented by the aforementioned formula (5) (where the methyl groups are not substituted by the dimethylvinyl groups).

B-8: Resin composition comprising polyethylene and a silicone compound, obtained by melt kneading 50 wt. % of low density polyethylene having a weight average molecular weight of 100,000 and a melt index MI=10 g/10 min. and 50 wt. % of the same silicone compound as in B-7, using a biaxial extruder. Graft ratio of the silicone compound toward polyethylene determined by the aforementioned procedure was not more than 0.5 wt. %.

B-9: Commercially available master batch of polyethylene and a silicone compound (silicone gum) ("BY-27-006" made by Toray-Dow Corning Co.; silicone content: 50 wt. %).

B-10: Resin composition comprising silicone compound-grafted ethylene-ethyl acrylate copolymer, obtained by melt kneading 59 parts by weight of ethylene-ethyl acrylate having an ethyl acrylate content of 25%, 41 parts by weight of a silicone compound having a viscosity of 300,000 centistokes at 23° C. and a methyl vinyl content of 1.0%, 0.012 parts by weight of an organic peroxide (2,5-dimethyl-2,5-di(t-butylperoxy) hexane), and 0.012 parts by weight of an antioxidant (triethyleneglycol-bis-(3-(3-t-butyl-5-methyl-4-hydroxyphenyl)-propionate), using a Labo-Plastomill at a temperature of 180° C. and 60 rpm for 20 minutes, and a silicone compound. The resin composition had a melt index MI of 0.2 g/10 min. Graft ratio of the silicone compound determined by the aforementioned procedure was 99.9 wt. %, and the ratio of silicone compound-grafted ethylene-ethyl acrylate copolymer resin to silicone compound was 99.96/0.04 (by weight).

C. Lubricants

C-1: Liquid ethylene-propylene copolymer (ethylene/propylene=50/50 by mole; polymerization ratio=55).

C-2: Dilauryl adipate ester

C-3: Cetyl myristate ester

C-4: Polyethylene wax having an average molecular weight of 500

C-5: Unilin® alcohol (unilin® 700, made by Petrolite Co.)

D. Inorganic Fillers

D-1: Wollastonite having a volume average particle size of 6 μm measured by a laser-type particle size measurement equipment and a shorter diameter of 2 μm and a longer diameter of 50 μm, measured by a scanning electron microscope.

D-2: Granular wollastonite having a volume average particle size of 3 μm measured by a laser-type particle size measurement equipment and an aspect ratio of 3.

D-3: Potassium titanate whiskers having a shorter diameter of 0.15 μm and a longer diameter of 20 μm, measured by a scanning electron microscope.

D-4: Glass fibers ECS 03 T-651 (made by Nippon Electric Glass Co., Ltd.)

E. Others

E-1: Tuftec H1913, made by Asahi Kasei Kogyo K.K.

E-2: Ethylene-butene copolymer having a weight average molecular weight of 50,000.

Evaluation Methods (1) Evaluation of Physical Properties

Pellets obtained in the following Examples and Comparative Examples were dried at 80° C. for 3 hours, and then molded into test pieces by a 5-ounce molding machine (IS-100E, made by Toshiba Machine Co., Ltd.) set to a cylinder temperature of 200° C. under such conditions as mold temperature: 70° C. and cooling time: 30 seconds. The following tests were conducted with the test pieces and pellets.

① Melt index: measured on the basis of ASTM D1238-57T.

② Tensile strength and tensile elongation: measured on the-basis of ASTM D638.

③ Bending strength and flexural modulus of elasticity: measured on the basis of ASTM D790.

④ Izod impact strength; measured on the basis of ASTM D256.

(2) Slidability
1 Initial Slidability

Pellets obtained in the following Examples and Comparative Examples were dried at 80° C. for 3 hours and then molded into 3 mm-thick flat plates as test pieces by a 1-ounce molding machine (TI-30G, made by Toyo Machinery & Metal Co., Ltd.) set to a cylinder temperature of 200° C. under such conditions as mold temperature: 70° C. and cooling time: 20 seconds. The test pieces were subjected to a reciprocation test of 30,000 runs (10,000 runs for inorganic filler-admixed test pieces), using a reciprocating friction-wear tester (Model AFT-15MS, made by Toyo Seimitsu K.K.) under such conditions as load: 1 kg, linear velocity: 30 mm/sec, reciprocating distance: 20 mm and surrounding temperature: 23° C., to determine a coefficient of friction and a wear rate. SUS 304 test pieces (balls, 5 mm in diameter) and polyoxymethylene resin test pieces (cylinders, 5 mm in diameter, with a tip end at R=2.5 mm, molded from Tenac-C 4520, made by Asahi Kasei Kogyo K.K.) were used as counter members for evaluating the slidability of the test pieces.

2 Slidability After Solvent Washing 3 mm-thick flat plates used for the evaluation of initial slidability were dipped in trichloroethylene heated to 40° C., washed for 30 minutes, taken out therefrom and dried with hot air for 5 minutes. The foregoing washing and drying were repeated 5 times. Then, the test pieces were subjected to a reciprocating test of 30,000 runs (10,000 runs for the inorganic filler-admixed test pieces), using a reciprocating friction-wear tester (Model AFT-15MS, made by Toyo Seimitsu K.K.) under such conditions as load: 1 kg, linear velocity: 30 mm/sec, reciprocating distance: 20 mm and surrounding temperature: 23° C., to determine a coefficient of friction and a wear rate. SUS304 test pieces (balls, 5 mm in diameter) and polyoxymethylene resin test pieces (cylinders, 5 mm in diameter, with a tip end at R=2.5 mm, molded from Tenac-C 4520, made by Asahi Kasei Kogyo K.K.) were used as counter members for evaluating the slidability of the test pieces.

(3) Heat Stability
1 Heat Stability at Molding

Pellets obtained in the following Examples and Comparative Examples were dried at 100° C. for 3 hours, then made to reside in a 1-ounce molding machine set to a cylinder temperature of 250° C. (TI-30G, made by Toyo Machinery and Metal Co., Ltd.), and then molded into 3 mm-thick flat plates under such conditions as mold temperature: 70° C. and cooling time: 15 seconds, to measure the residence time until silver appeared on the molding surface.

2 Heat-resistant Ageing Property

Test pieces for use in measurement of tensile strength and elongation in the determination of physical properties were subjected to ageing in a gear oven set to 140° C. and periodically taken out therefrom to measure the tensile strength on the basis of ASTM D638. Evaluation was made on the basis of number of days until the strength became 80% of the initial strength.

(4) Thin-molding Peeling

Pellets obtained in the following Examples and Comparative Examples were dried at 80° C. for 3 hours and molded into spiral thin moldings, 1 mm thick and 5 mm wide, using a 5-ounce molding machine (SH-75, made by Sumitomo Heavy Industries, Ltd.) set to a cylinder temperature of 200° C. (220° C. for the inorganic filler-admixed test pieces) at a mold temperature of 80° C. and under an injection pressure of 7 MPa, while changing the injection rate to evaluate the surface peeling state on the basis of the following evaluation standard:

⊚: No peeling was observed at an injection rate of 80%.

○: Peeling was observed at an injection rate of more than 80%.

Δ: Peeling was observed at an injection rate of 40% or more.

×: Peeling was observed at an injection rate of 20% or more.

(5) Molding Surface Appearance

Pellets obtained in the following Examples and Comparative Examples were dried at 80° C. for 3 hours, and then molded into 10 flat plates, 150 mm in square and 3 mm thick, (with a 1 mm-high pin gate provided on one side along the center line and at a position 30 mm far from the edge), using a 5-ounce molding machine (IS-100E, made by Toshiba Machine Co., Ltd.) set to a cylinder temperature of 200° C. under such conditions as mold temperature: 70° C. and cooling time: 30 seconds. Sizes of flow marks appearing around the pin gate of the moldings were measured. An average flow mark size of ten flat plates was obtained and evaluated on the basis of the following standard:

Evaluation Standard

○ Flow mark radius (with the pin gate at the center) was less than 20 mm.

Δ: Flow mark radius was 20–30 mm.

×: Flow mark radius was 30–40 mm.

××: Flow mark radius was over 40 mm.

Example 1

100 Parts by weight of polyoxymethylene resin (A-1), 2.5 parts by weight of polyolefinic resin composition (B-1), 0.3 parts by weight of triethyleneglycol-bis-[3-(3-t-butyl-5-methyl-4-hydroxyphenyl)propionate], 0.05 parts by weight of polyamide 66 and 0.05 parts by weight of calcium stearate as stabilizers were uniformly blended by a Henschel mixer and then extrusion-kneaded by a biaxial extruder (L/D=30) set to 200° C. The extruded resin composition was made into pellets by a strand cutter. All the aforementioned properties of the pellets were evaluated and the results are shown in Table 1. In the resin composition shown in Table 1, units of the amounts of all the components are based on "parts by weight" (the same basis is likewise applied to Tables 2 to 12).

Examples 2 to 6 and Comparative Examples 1 to 3

The resin composition was changed to those shown in Table 1 and pellets were prepared from these resin compositions in the same manner as in Example 1. All the aforementioned properties were evaluated. Results are shown in Table 1. In Example 5, the ratio of silicone compound-grafted polyethylene resin to silicone compound was 79.6/20.4 (by weight).

TABLE 1

|  |  |  | Ex. 1 | Ex. 2 | Ex. 3 | Comp. Ex. 1 | Comp. Ex. 2 | Comp. Ex. 3 | Ex. 4 | Ex. 5 | Ex. 6 |
|---|---|---|---|---|---|---|---|---|---|---|---|
| Composition |  |  |  |  |  |  |  |  |  |  |  |
| (A) Polyoxymethylene resin | (A-1) |  | 100 | 100 | 100 | 100 | 100 | 100 | 100 | 100 | 100 |
| (B) Polyolefinic resin composition, etc. | (B-1) |  | 2.5 |  |  |  |  |  |  |  |  |
|  | (B-2) |  |  | 2.5 |  |  |  |  |  |  |  |
|  | (B-3) |  |  |  | 2.5 |  |  |  |  |  |  |
|  | (B-4) |  |  |  |  | 2.5 |  |  |  |  |  |
|  | (B-5) |  |  |  |  |  |  |  |  | 2 |  |
|  | (B-6) |  |  |  |  |  |  |  |  |  | 2 |
|  | (B-7) |  |  |  |  |  | 1 |  |  | 0.3 |  |
|  | (B-8) |  |  |  |  |  |  | 2 |  |  |  |
| Results |  |  |  |  |  |  |  |  |  |  |  |
| Physical properties | Melt index (g/10 min) |  | 22 | 22 | 23 | 22 | 22 | 22 | 22 | 22 | 22 |
|  | Tensile strength (MPa) |  | 60 | 60 | 60 | 59 | 61 | 61 | 61 | 61 | 60 |
|  | Tensile elongation (%) |  | 50 | 50 | 50 | 50 | 40 | 50 | 50 | 50 | 50 |
|  | Bending strength (MPa) |  | 90 | 91 | 90 | 90 | 90 | 91 | 92 | 92 | 91 |
|  | Flexural modulus (GPa) |  | 2.7 | 2.7 | 2.7 | 2.7 | 2.8 | 2.7 | 2.8 | 2.8 | 2.6 |
|  | Izod impact strength (J/m) |  | 65 | 65 | 66 | 67 | 67 | 65 | 61 | 61 | 64 |
| Peeling insusceptibility | Thin-molding peeling |  | ⊚ | ⊚ | ○ | Δ | x | x | ⊚ | ⊚ | ⊚ |
| Heat stability | Heat stability at molding, Residence time until silver appearance (min) |  | 55 | 55 | 55 | 55 | 55 | 55 | 60 | 60 | 60 |
|  | Heat-resistant ageing property, Number of days until lowering of tensile elongation to 80% (days) |  | 25 | 30 | 30 | 25 | 20 | 25 | 30 | 30 | 30 |
| Slidability | Polyoxyethylene resin as counter member | Coefficient of friction ($\mu$) | 1 run | 0.03 | 0.03 | 0.03 | 0.03 | 0.04 | 0.04 | 0.03 | 0.03 | 0.03 |
|  |  |  | 10 runs | 0.03 | 0.03 | 0.03 | 0.03 | 0.04 | 0.03 | 0.03 | 0.03 | 0.03 |
|  |  |  | 100 runs | 0.03 | 0.03 | 0.03 | 0.03 | 0.04 | 0.03 | 0.03 | 0.03 | 0.03 |
|  |  |  | 1000 runs | 0.03 | 0.03 | 0.03 | 0.03 | 0.05 | 0.03 | 0.03 | 0.03 | 0.03 |
|  |  |  | 5000 runs | 0.09 | 0.08 | 0.08 | 0.09 | 0.11 | 0.09 | 0.07 | 0.06 | 0.06 |
|  |  |  | 10000 runs | 0.15 | 0.14 | 0.14 | 0.15 | 0.15 | 0.15 | 0.13 | 0.12 | 0.13 |
|  |  |  | 30000 runs | 0.17 | 0.16 | 0.17 | 0.18 | 0.18 | 0.18 | 0.15 | 0.14 | 0.14 |
|  |  | Wear rate ($\mu$m) | 30000 runs | 30 | 30 | 25 | 35 | 50 | 35 | 25 | 20 | 30 |
|  | Stainless steel as counter member | Coefficient of friction ($\mu$) | 1 run | 0.03 | 0.03 | 0.04 | 0.04 | 0.04 | 0.04 | 0.03 | 0.03 | 0.03 |
|  |  |  | 10 runs | 0.03 | 0.03 | 0.03 | 0.04 | 0.04 | 0.04 | 0.03 | 0.03 | 0.03 |
|  |  |  | 100 runs | 0.04 | 0.04 | 0.04 | 0.04 | 0.04 | 0.04 | 0.04 | 0.04 | 0.04 |
|  |  |  | 1000 runs | 0.06 | 0.06 | 0.06 | 0.08 | 0.09 | 0.08 | 0.06 | 0.06 | 0.06 |
|  |  |  | 5000 runs | 0.09 | 0.10 | 0.10 | 0.10 | 0.11 | 0.10 | 0.10 | 0.10 | 0.10 |
|  |  |  | 10000 runs | 0.12 | 0.12 | 0.13 | 0.12 | 0.14 | 0.12 | 0.12 | 0.12 | 0.12 |
|  |  |  | 30000 runs | 0.14 | 0.14 | 0.14 | 0.14 | 0.15 | 0.14 | 0.14 | 0.14 | 0.14 |
|  |  | Wear rate ($\mu$m) | 30000 runs | 40 | 40 | 40 | 40 | 45 | 40 | 35 | 35 | 35 |
| Slidability after solvent washing | Polyoxyethylene resin as counter member | Coefficient of friction ($\mu$) | 1 run | 0.04 | 0.04 | 0.04 | 0.10 | 0.24 | 0.12 | 0.04 | 0.04 | 0.03 |
|  |  |  | 10 runs | 0.03 | 0.03 | 0.03 | 0.06 | 0.13 | 0.06 | 0.03 | 0.03 | 0.03 |
|  |  |  | 100 runs | 0.03 | 0.03 | 0.03 | 0.09 | 0.12 | 0.08 | 0.03 | 0.03 | 0.03 |
|  |  |  | 1000 runs | 0.03 | 0.03 | 0.03 | 0.10 | 0.12 | 0.09 | 0.03 | 0.03 | 0.03 |
|  |  |  | 5000 runs | 0.09 | 0.09 | 0.09 | 0.12 | 0.15 | 0.15 | 0.07 | 0.07 | 0.07 |
|  |  |  | 10000 runs | 0.15 | 0.15 | 0.15 | 0.18 | 0.20 | 0.19 | 0.13 | 0.13 | 0.14 |
|  |  |  | 30000 runs | 0.18 | 0.18 | 0.18 | 0.22 | 0.29 | 0.23 | 0.16 | 0.16 | 0.15 |
|  |  | Wear rate ($\mu$m) | 30000 runs | 30 | 30 | 30 | 85 | 120 | 90 | 30 | 30 | 30 |

Examples 7 to 9 and Comparative Examples 4 to 6

The resin composition was changed to those shown in Table 2, and pellets were prepared from the resin compositions in the same manner as in Example 1. All the aforementioned properties were evaluated. Results are shown in Table 2.

TABLE 2

|  |  |  | Ex. 7 | Ex. 8 | Ex. 9 | Comp. Ex. 4 | Comp. Ex. 5 | Comp. Ex. 6 |
|---|---|---|---|---|---|---|---|---|
| Composition |  |  |  |  |  |  |  |  |
| (A) Polyoxymethylene resin | (A-2) |  | 100 | 100 | 100 | 100 | 100 | 100 |
| (B) Polyolefinic resin composition, etc. | (B-1) |  | 2.5 |  |  |  |  |  |
|  | (B-2) |  |  | 2.5 |  |  |  |  |
|  | (B-3) |  |  |  | 2.5 |  |  |  |
|  | (B-4) |  |  |  |  | 2.5 |  |  |
|  | (B-7) |  |  |  |  |  | 1 |  |
|  | (B-8) |  |  |  |  |  |  | 2 |

TABLE 2-continued

|  |  |  |  | Ex. 7 | Ex. 8 | Ex. 9 | Comp. Ex. 4 | Comp. Ex. 5 | Comp. Ex. 6 |
|---|---|---|---|---|---|---|---|---|---|
| Results |  |  |  |  |  |  |  |  |  |
| Physical properties | Melt index (g/10 min) |  |  | 22 | 23 | 22 | 23 | 22 | 22 |
|  | Tensile strength (MPa) |  |  | 56 | 56 | 55 | 55 | 61 | 60 |
|  | Tensile elongation (%) |  |  | 50 | 50 | 50 | 50 | 40 | 50 |
|  | Bending strength (MPa) |  |  | 84 | 84 | 84 | 84 | 90 | 91 |
|  | Flexural modulus (GPa) |  |  | 2.4 | 2.4 | 2.3 | 2.4 | 2.8 | 2.7 |
|  | Izod impact strength (J/m) |  |  | 64 | 65 | 64 | 65 | 67 | 65 |
| Peeling insusceptibility | Thin-molding peeling |  |  | ⊚ | ⊚ | ○ | Δ | x | x |
| Heat stability | Heat stability at molding, Residence time until silver appearance (min) |  |  | 120 | 120 | 120 | 120 | 120 | 120 |
|  | Heat-resistant ageing property, Number of days until lowering of tensile elongation to 80% (days) |  |  | 35 | 35 | 35 | 35 | 30 | 35 |
| Slidability | Polyoxyethylene resin as counter member | Coefficient of friction ($\mu$) | 1 run | 0.06 | 0.06 | 0.06 | 0.06 | 0.08 | 0.05 |
|  |  |  | 10 runs | 0.06 | 0.06 | 0.06 | 0.06 | 0.08 | 0.05 |
|  |  |  | 100 runs | 0.06 | 0.05 | 0.06 | 0.07 | 0.09 | 0.06 |
|  |  |  | 1000 runs | 0.07 | 0.06 | 0.06 | 0.08 | 0.11 | 0.08 |
|  |  |  | 5000 runs | 0.17 | 0.16 | 0.16 | 0.17 | 0.21 | 0.18 |
|  |  |  | 10000 runs | 0.26 | 0.25 | 0.25 | 0.27 | 0.29 | 0.26 |
|  |  |  | 30000 runs | 0.36 | 0.35 | 0.36 | 0.37 | 0.42 | 0.36 |
|  |  | Wear rate ($\mu$m) | 30000 runs | 90 | 90 | 90 | 95 | 140 | 90 |
|  | Stainless steel as counter member | Coefficient of friction ($\mu$) | 1 run | 0.06 | 0.06 | 0.06 | 0.06 | 0.08 | 0.06 |
|  |  |  | 10 runs | 0.06 | 0.06 | 0.06 | 0.06 | 0.09 | 0.06 |
|  |  |  | 100 runs | 0.06 | 0.06 | 0.06 | 0.06 | 0.10 | 0.06 |
|  |  |  | 1000 runs | 0.08 | 0.06 | 0.08 | 0.09 | 0.12 | 0.13 |
|  |  |  | 5000 runs | 0.16 | 0.16 | 0.17 | 0.17 | 0.21 | 0.16 |
|  |  |  | 10000 runs | 0.20 | 0.20 | 0.21 | 0.22 | 0.29 | 0.21 |
|  |  |  | 30000 runs | 0.30 | 0.28 | 0.29 | 0.32 | 0.35 | 0.28 |
|  |  | Wear rate ($\mu$m) | 30000 runs | 90 | 85 | 90 | 105 | 120 | 85 |
| Slidability after solvent washing | Polyoxyethylene resin as counter member | Coefficient of friction ($\mu$) | 1 run | 0.06 | 0.06 | 0.06 | 0.14 | 0.24 | 0.18 |
|  |  |  | 10 runs | 0.06 | 0.06 | 0.06 | 0.08 | 0.13 | 0.09 |
|  |  |  | 100 runs | 0.06 | 0.06 | 0.06 | 0.09 | 0.11 | 0.10 |
|  |  |  | 1000 runs | 0.07 | 0.06 | 0.07 | 0.10 | 0.13 | 0.10 |
|  |  |  | 5000 runs | 0.16 | 0.17 | 0.16 | 0.16 | 0.25 | 0.18 |
|  |  |  | 10000 runs | 0.25 | 0.25 | 0.24 | 0.25 | 0.32 | 0.27 |
|  |  |  | 30000 runs | 0.35 | 0.36 | 0.36 | 0.46 | 0.55 | 0.48 |
|  |  | Wear rate ($\mu$m) | 30000 runs | 85 | 85 | 80 | 110 | 160 | 140 |

Example 10

100 Parts by weight of polyoxymethylene resin (A-3), 2.5 parts by weight of polyolefinic resin composition (B-1), and 0.3 parts by weight of triethyleneglycol-bis-[3-(3-t-butyl-5-methyl-4-hydroxyphenyl)propionate] and 0.30 parts by weight of poly-β-alanine as stabilizers were uniformly blended by a Henschel mixer and then extrusion-kneaded by a biaxial extruder (L/D=30) set to 200° C. The extruded resin composition was made into pellets by a strand cutter. All the aforementioned properties of moldings made from the pellets were evaluated. Results are shown in Table 3.

Examples 11 and 12 and Comparative Examples 7 to 9

The resin composition was changed to those shown in Table 3 and the resin compositions were made into pellets in the same manner as in Example 10. All the aforementioned properties were evaluated. Results are shown in Table 3.

TABLE 3

|  |  |  | Ex. 10 | Ex. 11 | Ex. 12 | Comp. Ex. 7 | Comp. Ex. 8 | Comp. Ex. 9 |
|---|---|---|---|---|---|---|---|---|
| Composition |  |  |  |  |  |  |  |  |
| (A) Polyoxymethylene resin | (A-3) |  | 100 | 100 | 100 | 100 | 100 | 100 |
| (B) Polyolefinic resin composition, etc. | (B-1) |  | 2.5 |  |  |  |  |  |
|  | (B-2) |  |  | 2.5 |  |  |  |  |
|  | (B-3) |  |  |  | 2.5 |  |  |  |
|  | (B-4) |  |  |  |  | 2.5 |  |  |
|  | (B-7) |  |  |  |  |  | 1 |  |
|  | (B-8) |  |  |  |  |  |  | 2 |
| Results |  |  |  |  |  |  |  |  |
| Physical properties | Melt index (g/10 min) |  | 22 | 22 | 23 | 23 | 22 | 22 |
|  | Tensile strength (MPa) |  | 62 | 63 | 63 | 62 | 61 | 62 |

TABLE 3-continued

|  |  |  |  | Ex. 10 | Ex. 11 | Ex. 12 | Comp. Ex. 7 | Comp. Ex. 8 | Comp. Ex. 9 |
|---|---|---|---|---|---|---|---|---|---|
|  |  | Tensile elongation (%) |  | 40 | 40 | 40 | 40 | 40 | 40 |
|  |  | Bending strength (MPa) |  | 91 | 92 | 91 | 92 | 90 | 91 |
|  |  | Flexural modulus (GPa) |  | 2.7 | 2.8 | 2.8 | 2.7 | 2.8 | 2.7 |
|  |  | Izod impact strength (J/m) |  | 51 | 55 | 54 | 55 | 57 | 51 |
| Peeling insusceptibility | Thin-molding peeling |  |  | ⊚ | ⊚ | ○ | Δ | x | x |
| Heat stability | Heat stability at molding, Residence time until silver appearance (min) |  |  | 30 | 30 | 25 | 25 | 25 | 30 |
|  | Heat-resistant ageing property, Number of days until lowering of tensile elongation to 80% (days) |  |  | 10 | 10 | 10 | 10 | 7 | 10 |
| Slidability | Polyoxyethylene resin as counter member | Coefficient of friction ($\mu$) | 1 run | 0.03 | 0.03 | 0.03 | 0.03 | 0.04 | 0.03 |
|  |  |  | 10 runs | 0.03 | 0.03 | 0.03 | 0.03 | 0.04 | 0.03 |
|  |  |  | 100 runs | 0.03 | 0.03 | 0.03 | 0.03 | 0.04 | 0.03 |
|  |  |  | 1000 runs | 0.03 | 0.03 | 0.03 | 0.03 | 0.05 | 0.03 |
|  |  |  | 5000 runs | 0.09 | 0.09 | 0.09 | 0.10 | 0.11 | 0.09 |
|  |  |  | 10000 runs | 0.15 | 0.15 | 0.14 | 0.16 | 0.15 | 0.15 |
|  |  |  | 30000 runs | 0.17 | 0.17 | 0.17 | 0.18 | 0.18 | 0.17 |
|  |  | Wear rate ($\mu$m) | 30000 runs | 30 | 30 | 30 | 35 | 45 | 30 |
|  | Stainless steel as counter member | Coefficient of friction ($\mu$) | 1 run | 0.03 | 0.03 | 0.03 | 0.04 | 0.04 | 0.03 |
|  |  |  | 10 runs | 0.03 | 0.03 | 0.03 | 0.04 | 0.04 | 0.03 |
|  |  |  | 100 runs | 0.04 | 0.04 | 0.04 | 0.04 | 0.04 | 0.04 |
|  |  |  | 1000 runs | 0.06 | 0.06 | 0.06 | 0.08 | 0.09 | 0.06 |
|  |  |  | 5000 runs | 0.09 | 0.08 | 0.08 | 0.10 | 0.10 | 0.09 |
|  |  |  | 10000 runs | 0.12 | 0.11 | 0.12 | 0.13 | 0.14 | 0.12 |
|  |  |  | 30000 runs | 0.14 | 0.14 | 0.14 | 0.14 | 0.15 | 0.14 |
|  |  | Wear rate ($\mu$m) | 30000 runs | 30 | 30 | 30 | 35 | 50 | 40 |
| Slidability after solvent washing | Polyoxyethylene resin as counter member | Coefficient of friction ($\mu$) | 1 run | 0.03 | 0.04 | 0.04 | 0.10 | 0.22 | 0.10 |
|  |  |  | 10 runs | 0.03 | 0.03 | 0.03 | 0.06 | 0.13 | 0.07 |
|  |  |  | 100 runs | 0.03 | 0.03 | 0.03 | 0.08 | 0.12 | 0.08 |
|  |  |  | 1000 runs | 0.03 | 0.03 | 0.03 | 0.09 | 0.12 | 0.09 |
|  |  |  | 5000 runs | 0.09 | 0.10 | 0.09 | 0.11 | 0.15 | 0.15 |
|  |  |  | 10000 runs | 0.15 | 0.15 | 0.15 | 0.19 | 0.21 | 0.20 |
|  |  |  | 30000 runs | 0.17 | 0.17 | 0.18 | 0.22 | 0.29 | 0.23 |
|  |  | Wear rate ($\mu$m) | 30000 runs | 30 | 30 | 30 | 65 | 105 | 85 |

Example 13

100 Parts by weight of polyoxymethylene resin (A-4), 2.5 parts by weight of polyolefinic resin composition (B-1), and 0.05 parts by weight of polyamide and 0.05 parts by weight of calcium stearate as stabilizers were uniformly blended by a Henschel mixer and then extrusion-kneaded by a biaxial extruder (L/D=30) set to 200° C. The extruded resin composition was made into pellets by a strand cutter. All the aforementioned properties of moldings made from the pellets were evaluated. Results are shown in Table 4.

Examples 14 to 16 and Comparative Examples 10 and 11

The resin composition was changed to those shown in Table 4 and pellets were made from the resin compositions in the same manner as in Example 13. All the aforementioned properties were evaluated. Results are shown in Table 4.

TABLE 4

|  |  |  |  | Ex. 13 | Ex. 14 | Ex. 15 | Ex. 16 | Comp. Ex. 10 | Comp. Ex. 11 |
|---|---|---|---|---|---|---|---|---|---|
| Composition |  |  |  |  |  |  |  |  |  |
| (A) | Polyoxymethylene resin | (A-1) |  |  | 50 | 20 | 50 | 100 | 100 |
|  |  | (A-4) |  | 100 | 50 | 80 | 50 |  |  |
| (B) | Polyolefinic resin composition, etc. | (B-1) |  | 2.5 | 2.5 | 2.5 | 2.5 |  |  |
|  |  | (B-7) |  |  |  |  |  | 1 |  |
|  |  | (B-8) |  |  |  |  |  |  | 2 |
| (C) | Lubricant | (C-1) |  |  |  |  | 3 |  |  |
| Results |  |  |  |  |  |  |  |  |  |
| Physical properties | Melt index (g/10 min) |  |  | 22 | 22 | 22 | 22 | 22 | 22 |
|  | Tensile strength (MPa) |  |  | 52 | 54 | 58 | 54 | 52 | 52 |
|  | Tensile elongation (%) |  |  | 60 | 50 | 50 | 50 | 55 | 50 |
|  | Bending strength (MPa) |  |  | 85 | 87 | 89 | 87 | 84 | 84 |

TABLE 4-continued

|  |  |  |  | Ex. 13 | Ex. 14 | Ex. 15 | Ex. 16 | Comp. Ex. 10 | Comp. Ex. 11 |
|---|---|---|---|---|---|---|---|---|---|
|  | Flexural modulus (GPa) |  |  | 2.4 | 2.5 | 2.7 | 2.5 | 2.4 | 2.3 |
|  | Izod impact strength (J/m) |  |  | 67 | 64 | 64 | 64 | 65 | 65 |
| Peeling insusceptibility | Thin-molding peeling |  |  | ⊚ | ⊚ | ⊚ | ⊚ | x | x |
| Heat stability | Heat stability at molding, Residence time until silver appearance (min) |  |  | 120 | 95 | 70 | 95 | 100 | 120 |
|  | Heat-resistant ageing property, Number of days until lowering of tensile elongation to 80% (days) |  |  | 50 | 40 | 35 | 40 | 30 | 35 |
| Slidability | Polyoxyethylene resin as counter member | Coefficient of friction ($\mu$) | 1 run | 0.06 | 0.05 | 0.03 | 0.03 | 0.08 | 0.06 |
|  |  |  | 10 runs | 0.06 | 0.05 | 0.03 | 0.03 | 0.08 | 0.06 |
|  |  |  | 100 runs | 0.06 | 0.05 | 0.03 | 0.04 | 0.09 | 0.09 |
|  |  |  | 1000 runs | 0.07 | 0.06 | 0.04 | 0.04 | 0.11 | 0.12 |
|  |  |  | 5000 runs | 0.18 | 0.14 | 0.11 | 0.09 | 0.22 | 0.23 |
|  |  |  | 10000 runs | 0.26 | 0.21 | 0.17 | 0.12 | 0.31 | 0.33 |
|  |  |  | 30000 runs | 0.32 | 0.25 | 0.19 | 0.16 | 0.45 | 0.48 |
|  |  | Wear rate ($\mu$m) | 30000 runs | 70 | 50 | 35 | 40 | 150 | 170 |
|  | Stainless steel as counter member | Coefficient of friction ($\mu$) | 1 run | 0.06 | 0.05 | 0.03 | 0.05 | 0.08 | 0.08 |
|  |  |  | 10 runs | 0.06 | 0.05 | 0.04 | 0.05 | 0.08 | 0.09 |
|  |  |  | 100 runs | 0.07 | 0.06 | 0.04 | 0.06 | 0.10 | 0.10 |
|  |  |  | 1000 runs | 0.11 | 0.08 | 0.07 | 0.08 | 0.12 | 0.13 |
|  |  |  | 5000 runs | 0.16 | 0.13 | 0.10 | 0.13 | 0.21 | 0.20 |
|  |  |  | 10000 runs | 0.21 | 0.16 | 0.14 | 0.18 | 0.30 | 0.32 |
|  |  |  | 30000 runs | 0.28 | 0.21 | 0.17 | 0.21 | 0.36 | 0.35 |
|  |  | Wear rate ($\mu$m) | 30000 runs | 70 | 55 | 45 | 60 | 120 | 110 |
| Slidability after solvent washing | Polyoxyethylene resin as counter member | Coefficient of friction ($\mu$) | 1 run | 0.06 | 0.05 | 0.04 | 0.04 | 0.24 | 0.20 |
|  |  |  | 10 runs | 0.06 | 0.05 | 0.03 | 0.03 | 0.15 | 0.16 |
|  |  |  | 100 runs | 0.06 | 0.05 | 0.04 | 0.04 | 0.13 | 0.15 |
|  |  |  | 1000 runs | 0.07 | 0.06 | 0.04 | 0.04 | 0.18 | 0.16 |
|  |  |  | 5000 runs | 0.18 | 0.13 | 0.11 | 0.09 | 0.25 | 0.25 |
|  |  |  | 10000 runs | 0.25 | 0.19 | 0.16 | 0.12 | 0.36 | 0.38 |
|  |  |  | 30000 runs | 0.30 | 0.22 | 0.17 | 0.16 | 0.52 | 0.56 |
|  |  | Wear rate ($\mu$m) | 30000 runs | 65 | 45 | 35 | 35 | 170 | 180 |

Example 17

100 Parts by weight of polyoxymethylene resin (A-1), 2.5 parts by weight of polyolefinic resin composition (B-1), 2 parts by weight of lubricant (C-1), and 0.3 parts by weight of triethyleneglycol-bis-[3-(3-t-butyl-5-methyl-4-hydroxyphenyl)propionate, 0.05 parts by weight of polyamide 66 and 0.05 parts by weight of calcium stearate were uniformly blended by a Henschel mixer and then extrusion-kneaded by a biaxial extruder (L/D=30) set to 200° C. The extruded resin composition was made into pellets by a strand cutter. All the aforementioned properties of moldings made from the resin composition were evaluated. Results are shown in Table 5.

Examples 18 to 21 and Comparative Examples 12 and 13

The resin composition was changed to those shown in Table 5 and pellets were made from the resin compositions in the same manner as in Example 17. All the aforementioned properties were evaluated. Results are shown in Table 5.

TABLE 5

|  |  |  |  | Ex. 17 | Ex. 18 | Ex. 19 | Comp. Ex. 12 | Comp. Ex. 13 | Ex. 20 | Ex. 21 |
|---|---|---|---|---|---|---|---|---|---|---|
| Composition |  |  |  |  |  |  |  |  |  |  |
| (A) | Polyoxymethylene resin | (A-1) |  | 100 | 100 | 100 | 100 | 100 | 100 | 100 |
| (B) | Polyolefinic resin composition, etc. | (B-1) |  | 2.5 | 2.5 | 2.5 |  |  |  |  |
|  |  | (B-5) |  |  |  |  |  |  | 2 |  |
|  |  | (B-6) |  |  |  |  |  |  |  | 2 |
|  |  | (B-7) |  |  |  |  | 1 |  |  |  |
|  |  | (B-8) |  |  |  |  |  | 2 |  | 2 |
| (C) | Lubricant | (C-1) |  | 2 |  |  |  |  |  |  |
|  |  | (C-2) |  |  | 1 |  | 1 | 1 |  |  |
|  |  | (C-4) |  |  |  | 1 |  |  | 1 |  |
|  |  | (C-5) |  |  |  |  |  | 3 |  | 1 |
| Results |  |  |  |  |  |  |  |  |  |  |
| Physical properties | Melt index (g/10 min) |  |  | 24 | 22 | 23 | 22 | 22 | 22 | 22 |
|  | Tensile strength (MPa) |  |  | 59 | 60 | 60 | 59 | 60 | 60 | 60 |

TABLE 5-continued

|  |  |  |  | Ex. 17 | Ex. 18 | Ex. 19 | Comp. Ex. 12 | Comp. Ex. 13 | Ex. 20 | Ex. 21 |
|---|---|---|---|---|---|---|---|---|---|---|
|  |  | Tensile elongation (%) |  | 60 | 50 | 50 | 45 | 50 | 50 | 50 |
|  |  | Bending strength (MPa) |  | 88 | 90 | 91 | 92 | 91 | 91 | 91 |
|  |  | Flexural modulus (GPa) |  | 2.6 | 2.6 | 2.7 | 2.7 | 2.6 | 2.7 | 2.8 |
|  |  | Izod impact strength (J/m) |  | 64 | 65 | 62 | 63 | 64 | 61 | 62 |
| Peeling insusceptibility | Thin-molding peeling |  |  | ○ | ⊚ | ⊚ | x | x | ⊚ | ⊚ |
| Heat stability | Heat stability at molding, Residence time until silver appearance (min) |  |  | 60 | 55 | 55 | 50 | 55 | 60 | 60 |
|  | Heat-resistant ageing property, Number of days until lowering of tensile elongation to 80% (days) |  |  | 35 | 30 | 30 | 35 | 25 | 30 | 30 |
| Slidability | Polyoxyethylene resin as counter member | Coefficient of friction ($\mu$) | 1 run | 0.03 | 0.03 | 0.03 | 0.04 | 0.03 | 0.03 | 0.03 |
|  |  |  | 10 runs | 0.03 | 0.03 | 0.03 | 0.04 | 0.03 | 0.03 | 0.03 |
|  |  |  | 100 runs | 0.04 | 0.03 | 0.03 | 0.04 | 0.03 | 0.03 | 0.03 |
|  |  |  | 1000 runs | 0.04 | 0.03 | 0.03 | 0.05 | 0.03 | 0.03 | 0.03 |
|  |  |  | 5000 runs | 0.10 | 0.09 | 0.09 | 0.10 | 0.07 | 0.07 | 0.06 |
|  |  |  | 10000 runs | 0.12 | 0.11 | 0.11 | 0.12 | 0.10 | 0.07 | 0.06 |
|  |  |  | 30000 runs | 0.14 | 0.10 | 0.12 | 0.17 | 0.17 | 0.08 | 0.07 |
|  |  | Wear rate ($\mu$m) | 30000 runs | 25 | 20 | 25 | 40 | 35 | 15 | 15 |
|  | Stainless steel as counter member | Coefficient of friction ($\mu$) | 1 run | 0.04 | 0.04 | 0.04 | 0.04 | 0.04 | 0.03 | 0.03 |
|  |  |  | 10 runs | 0.03 | 0.04 | 0.03 | 0.04 | 0.04 | 0.03 | 0.03 |
|  |  |  | 100 runs | 0.04 | 0.04 | 0.03 | 0.04 | 0.04 | 0.03 | 0.03 |
|  |  |  | 1000 runs | 0.05 | 0.06 | 0.05 | 0.06 | 0.08 | 0.05 | 0.05 |
|  |  |  | 5000 runs | 0.09 | 0.09 | 0.08 | 0.09 | 0.09 | 0.19 | 0.08 |
|  |  |  | 10000 runs | 0.12 | 0.10 | 0.10 | 0.11 | 0.11 | 0.10 | 0.10 |
|  |  |  | 30000 runs | 0.14 | 0.12 | 0.12 | 0.13 | 0.12 | 0.12 | 0.12 |
|  |  | Wear rate ($\mu$m) | 30000 runs | 40 | 30 | 30 | 35 | 30 | 30 | 30 |
| Slidability after solvent washing | Polyoxyethylene resin as counter member | Coefficient of friction ($\mu$) | 1 run | 0.03 | 0.04 | 0.04 | 0.11 | 0.15 | 0.04 | 0.04 |
|  |  |  | 10 runs | 0.03 | 0.03 | 0.03 | 0.06 | 0.08 | 0.03 | 0.03 |
|  |  |  | 100 runs | 0.03 | 0.03 | 0.03 | 0.08 | 0.08 | 0.03 | 0.03 |
|  |  |  | 1000 runs | 0.03 | 0.03 | 0.03 | 0.11 | 0.09 | 0.03 | 0.03 |
|  |  |  | 5000 runs | 0.08 | 0.09 | 0.08 | 0.13 | 0.16 | 0.07 | 0.06 |
|  |  |  | 10000 runs | 0.12 | 0.13 | 0.13 | 0.19 | 0.20 | 0.07 | 0.06 |
|  |  |  | 30000 runs | 0.14 | 0.15 | 0.15 | 0.24 | 0.28 | 0.08 | 0.07 |
|  |  | Wear rate ($\mu$m) | 30000 runs | 25 | 25 | 25 | 90 | 110 | 15 | 15 |

Comparative Example 14

100 Parts by weight of polyoxymethylene resin (A-3), 2.5 parts by weight of polyolefinic resin composition (B-10), and 0.3 parts by weight of triethyleneglycol-bis-[3-(3-t-butyl-5-methyl-4-hydroxyphenyl)propionate] and 0.30 parts by weight of poly-β-alanine were uniformly blended by a Henschel mixer and then extrusion-kneaded by a biaxial extruder (L/D=30) set to 200° C. The extruded resin composition was made into pellets by a strand cutter. All the aforementioned properties of moldings made from the pellets were evaluated. Results are shown in Table 6.

TABLE 6

|  |  |  |  |  | Comp. Ex. 14 | Ex. 10 |
|---|---|---|---|---|---|---|
| Composition |  |  |  |  |  |  |
| (A) Polyoxymethylene resin |  | (A-3) |  |  | 100 | 100 |
| (B) Polyolefinic resin composition, etc. |  | (B-1) |  |  |  | 2.5 |
|  |  | (B-10) |  |  | 2.5 |  |
| Results |  |  |  |  |  |  |
| Physical properties | Melt index (g/10 min) |  |  |  | 20 | 22 |
|  | Tensile strength (MPa) |  |  |  | 54 | 62 |
|  | Tensile elongation (%) |  |  |  | 50 | 40 |
|  | Bending strength (MPa) |  |  |  | 84 | 91 |
|  | Flexural modulus (GPa) |  |  |  | 2.4 | 2.7 |
|  | Izod impact strength (J/m) |  |  |  | 86 | 51 |
| Peeling insusceptibility | Thin-molding peeling |  |  |  | ⊚ | ⊚ |
| Heat stability | Heat stability at molding, Residence time until silver appearance (min) |  |  |  | 30 | 30 |
|  | Heat-resistant ageing property, Number of days until lowering of tensile elongation to 80% (days) |  |  |  | 10 | 10 |
| Slidability | Polyoxyethylene resin as counter member | Coefficient of friction ($\mu$) | 1 run |  | 0.28 | 0.03 |
|  |  |  | 10 runs |  | 0.29 | 0.03 |
|  |  |  | 100 runs |  | 0.30 | 0.03 |
|  |  |  | 1000 runs |  | 0.35 | 0.03 |
|  |  |  | 5000 runs |  | 0.38 | 0.09 |
|  |  |  | 10000 runs |  | 0.42 | 0.15 |
|  |  |  | 30000 runs |  | 0.45 | 0.17 |
|  |  | Wear rate ($\mu$m) | 30000 runs |  | 300 | 30 |
|  | Stainless steel as counter member | Coefficient of friction ($\mu$) | 1 run |  | 0.20 | 0.03 |
|  |  |  | 10 runs |  | 0.21 | 0.03 |
|  |  |  | 100 runs |  | 0.23 | 0.04 |
|  |  |  | 1000 runs |  | 0.24 | 0.06 |
|  |  |  | 5000 runs |  | 0.25 | 0.09 |
|  |  |  | 10000 runs |  | 0.27 | 0.12 |
|  |  |  | 30000 runs |  | 0.30 | 0.14 |
|  |  | Wear rate ($\mu$m) | 30000 runs |  | 150 | 30 |
| Slidability after | Polyoxyethylene | Coefficient of friction | 1 run |  | 0.31 | 0.03 |
|  |  |  | 10 runs |  | 0.32 | 0.03 |

TABLE 6-continued

|  |  |  |  | Comp. Ex. 14 | Ex. 10 |
|---|---|---|---|---|---|
| solvent washing | resin as counter member | ($\mu$) | 100 runs | 0.32 | 0.03 |
|  |  |  | 1000 runs | 0.35 | 0.03 |
|  |  |  | 5000 runs | 0.38 | 0.09 |
|  |  |  | 10000 runs | 0.42 | 0.15 |
|  |  |  | 30000 runs | 0.45 | 0.17 |
|  |  | Wear rate ($\mu$m) | 30000 runs | 300 | 30 |

Example 22

100 Parts by weight of polyoxymethylene resin (A-2), 25 parts by weight of inorganic filler (D-1), 2.5 parts by weight of polyolefinic resin composition (B-1), and 0.3 parts by weight of triethyleneglycol-bis-[3-(3-t-butyl-5-methyl-4-hydroxyphenyl)propionate, 0.05 parts by weight of polyamide 66 and 0.2 parts by weight of melamine as stabilizers were uniformly blended by a Henschel mixer and then extrusion-kneaded by a biaxial extruder (L/D=30) set to 200° C. The extruded resin composition was made into pellets by a strand cutter. All the aforementioned properties of moldings made from the pellets were evaluated. Results are shown in Table 7.

Example 23 and Comparative Examples 15 to 19

The resin composition was changed to those shown in Table 7, and pellets were made from the resin compositions in the same manner as in Example 22. All the aforementioned properties were evaluated. Results are shown in Table 7.

TABLE 7

|  |  |  |  | Ex. 22 | Ex. 23 | Comp. Ex. 15 | Comp. Ex. 16 | Comp. Ex. 17 | Comp. Ex. 18 | Comp. Ex. 19 |
|---|---|---|---|---|---|---|---|---|---|---|
| Composition |  |  |  |  |  |  |  |  |  |  |
| (A) Polyoxymethylene resin |  | (A-2) |  | 100 | 100 | 100 | 100 | 100 | 100 | 100 |
| (B) Polyolefinic resin composition, etc. |  | (B-1) |  | 2.5 | 2.5 |  |  |  |  |  |
|  |  | (B-7) |  |  |  |  |  |  | 1.5 |  |
|  |  | (B-8) |  |  |  |  |  |  |  | 3 |
| (C) Lubricant |  | (C-2) |  |  | 2.5 |  | 2.5 | 2.5 |  |  |
| (D) Inorganic filler |  | (D-1) |  | 25 | 25 | 25 | 25 | 25 | 25 | 25 |
| (E) Others |  | (E-2) |  |  |  |  |  | 25 |  |  |
| Results |  |  |  |  |  |  |  |  |  |  |
| Thin-molding peeling |  |  |  | ○ | ○ | ○ | ○ | ○ | x | x |
| Molding surface appearance |  |  |  | ○ | ○ | Δ | ○ | ○ | xx | x |
| Heat stability | Heat stability at molding, Residence time until silver appearance (min) |  |  | 95 | 90 | 95 | 90 | 90 | 85 | 90 |
|  | Heat-resistant ageing property, Number of days until lowering of tensile elongation to 80% (days) |  |  | 130 | 130 | 120 | 130 | 120 | 110 | 120 |
| Mechanical properties | Tensile strength (MPa) |  |  | 56 | 55 | 67 | 51 | 52 | 56 | 54 |
|  | Tensile elongation (%) |  |  | 6 | 6 | 5 | 7 | 6 | 7 | 6 |
|  | Bending strength (MPa) |  |  | 101 | 96 | 118 | 95 | 93 | 95 | 96 |
|  | Flexural modulus (GPa) |  |  | 4.5 | 4.4 | 4.6 | 4.4 | 4.4 | 4.4 | 4.4 |
|  | Izod impact strength (J/m) |  |  | 36 | 35 | 37 | 36 | 35 | 37 | 36 |
| P/D Slidability | Polyoxyethylene resin as counter member | Coefficient of friction ($\mu$) | 1 run | 0.07 | 0.07 | 0.41 | 0.25 | 0.13 | 0.07 | 0.07 |
|  |  |  | 10 runs | 0.06 | 0.06 | 0.45 | 0.26 | 0.13 | 0.08 | 0.08 |
|  |  |  | 100 runs | 0.06 | 0.06 | 0.50 | 0.29 | 0.13 | 0.15 | 0.08 |
|  |  |  | 1000 runs | 0.06 | 0.07 | 0.59 | 0.40 | 0.14 | 0.34 | 0.20 |
|  |  |  | 5000 runs | 0.08 | 0.08 | 0.68 | 0.51 | 0.15 | 0.52 | 0.33 |
|  |  |  | 10000 runs | 0.10 | 0.09 | — | 0.65 | 0.16 | 0.66 | 0.44 |
|  |  | Wear rate ($\mu$m) | 10000 runs | 20 | 17 | 280* | 340 | 45 | 350 | 210 |
|  | Stainless steel as counter member | Coefficient of friction ($\mu$) | 1 run | 0.07 | 0.06 | 0.25 | 0.11 | 0.10 | 0.09 | 0.07 |
|  |  |  | 10 runs | 0.07 | 0.06 | 0.30 | 0.10 | 0.10 | 0.15 | 0.08 |
|  |  |  | 100 runs | 0.07 | 0.06 | 0.41 | 0.10 | 0.10 | 0.28 | 0.13 |
|  |  |  | 1000 runs | 0.08 | 0.07 | 0.45 | 0.10 | 0.10 | 0.36 | 0.19 |
|  |  |  | 5000 runs | 0.11 | 0.08 | 0.53 | 0.11 | 0.11 | 0.45 | 0.21 |
|  |  |  | 10000 runs | 0.12 | 0.10 | — | 0.15 | 0.13 | 0.61 | 0.29 |
|  |  | Wear rate ($\mu$m) | 10000 runs | 10 | 7 | 250* | 20 | 18 | 290 | 170 |
| Slidability after solvent washing | Polyoxyethylene resin as counter member | Coefficient of friction ($\mu$) | 1 run | 0.08 | 0.07 |  |  | 0.23 | 0.25 | 0.19 |
|  |  |  | 10 runs | 0.06 | 0.06 |  |  | 0.19 | 0.28 | 0.21 |
|  |  |  | 100 runs | 0.06 | 0.06 |  |  | 0.20 | 0.30 | 0.23 |
|  |  |  | 1000 runs | 0.08 | 0.08 |  |  | 0.21 | 0.42 | 0.26 |
|  |  |  | 5000 runs | 0.10 | 0.10 |  |  | 0.23 | 0.55 | 0.38 |
|  |  |  | 10000 runs | 0.12 | 0.11 |  |  | 0.24 | 0.68 | 0.49 |
|  |  | Wear rate ($\mu$m) | 10000 runs | 25 | 20 |  |  | 80 | 380 | 260 |

*Wear rate after 5,000 runs

Example 24

100 Parts by weight of polyoxymethylene resin (A-2), 25 parts by weight of inorganic filler (D-2), 2.5 parts by weight of polyolefinic resin composition (B-6), and 0.3 parts by weight of triethyleneglycol-bis-[3-(3-t-butyl-5-methyl-4-hydroxyphenyl)propionate], 0.05 parts by weight of polyamide 66 and 0.2 parts by weight of melamine as stabilizers were uniformly blended by a Henschel mixer and then extrusion-kneaded by a biaxial extruder (L/D=30) set to 200° C. The extruded resin composition was cut into pellets by a strand cutter. All the aforementioned properties of moldings made from the pellets were evaluated. Results are shown in Table 8.

Examples 25 to 28 and Comparative Examples 20 to 22

The resin composition was changed to those shown in Table 8, and pellets were made from the resin composition in the same manner as in Example 24. All the aforementioned properties were evaluated. Results are shown in Table 8.

TABLE 8

| | | | Ex. 24 | Ex. 25 | Ex. 26 | Ex. 27 | Ex. 28 | Comp. Ex. 20 | Comp. Ex. 21 | Comp. Ex. 22 |
|---|---|---|---|---|---|---|---|---|---|---|
| Composition | | | | | | | | | | |
| (A) Polyoxymethylene resin | | (A-2) | 100 | 100 | 100 | 100 | 100 | 100 | 100 | 100 |
| (B) Polyolefinic resin composition, etc. | | (B-6) | 2.5 | 2.5 | 2.5 | 2.5 | 2.5 | | | |
| | | (B-7) | | | | | | 1.5 | | |
| | | (B-8) | | | | | | | 3 | |
| (C) Lubricant | | (C-1) | | | | | 2.5 | | | |
| | | (C-2) | | 2.5 | | | | | | 2.5 |
| | | (C-3) | | | 2.5 | | | | | |
| | | (C-4) | | | | | | | 2.5 | |
| (D) Inorganic filler | | (D-2) | 25 | 25 | 25 | 25 | 25 | 25 | 25 | 25 |
| (E) Others | | (E-2) | | | | | | | | 2.5 |
| Results | | | | | | | | | | |
| Thin-molding peeling | | | ○ | ○ | ○ | ○ | ○ | x | x | ○ |
| Molding surface appearance | | | ○ | ○ | ○ | ○ | ○ | xx | x | ○ |
| Heat stability | Heat stability at molding, Residence time until silver appearance (min) | | 95 | 90 | 95 | 95 | 95 | 85 | 90 | 90 |
| | Heat-resistant ageing property, Number of days until lowering of tensile elongation to 80% (days) | | 35 | 40 | 40 | 40 | 40 | 35 | 40 | 40 |
| Mechanical properties | Tensile strength (MPa) | | 51 | 50 | 50 | 50 | 50 | 52 | 50 | 50 |
| | Tensile elongation (%) | | 8 | 8 | 8 | 8 | 8 | 7 | 8 | 8 |
| | Bending strength (MPa) | | 88 | 87 | 88 | 87 | 86 | 90 | 88 | 88 |
| | Flexural modulus (GPa) | | 3.4 | 3.4 | 3.4 | 3.4 | 3.4 | 3.4 | 3.3 | 3.4 |
| | Izod impact strength (J/m) | | 38 | 38 | 37 | 37 | 37 | 38 | 37 | 36 |
| P/D Slidability | Polyoxyethylene resin as counter member | Coefficient of friction ($\mu$) 1 run | 0.07 | 0.07 | 0.07 | 0.07 | 0.07 | 0.07 | 0.07 | 0.18 |
| | | 10 runs | 0.07 | 0.07 | 0.07 | 0.06 | 0.06 | 0.08 | 0.08 | 0.18 |
| | | 100 runs | 0.07 | 0.07 | 0.07 | 0.06 | 0.07 | 0.16 | 0.10 | 0.18 |
| | | 1000 runs | 0.09 | 0.09 | 0.09 | 0.07 | 0.07 | 0.36 | 0.23 | 0.19 |
| | | 5000 runs | 0.11 | 0.10 | 0.09 | 0.09 | 0.08 | 0.55 | 0.36 | 0.21 |
| | | 10000 runs | 0.13 | 0.13 | 0.12 | 0.10 | 0.09 | 0.76 | 0.49 | 0.23 |
| | | Wear rate ($\mu$m) 10000 runs | 35 | 35 | 32 | 18 | 16 | 400 | 320 | 85 |
| | Stainless steel as counter member | Coefficient of friction ($\mu$) 1 run | 0.08 | 0.08 | 0.08 | 0.08 | 0.07 | 0.08 | 0.08 | 0.11 |
| | | 10 runs | 0.08 | 0.08 | 0.07 | 0.07 | 0.07 | 0.15 | 0.09 | 0.11 |
| | | 100 runs | 0.08 | 0.08 | 0.08 | 0.07 | 0.07 | 0.30 | 0.14 | 0.12 |
| | | 1000 runs | 0.10 | 0.09 | 0.09 | 0.08 | 0.07 | 0.39 | 0.22 | 0.13 |
| | | 5000 runs | 0.14 | 0.12 | 0.11 | 0.09 | 0.09 | 0.49 | 0.27 | 0.15 |
| | | 10000 runs | 0.16 | 0.15 | 0.14 | 0.12 | 0.11 | 0.65 | 0.31 | 0.18 |
| | | Wear rate ($\mu$m) 10000 runs | 19 | 16 | 14 | 10 | 10 | 330 | 190 | 25 |
| Slidability after solvent washing | Polyoxyethylene resin as counter member | Coefficient of friction ($\mu$) 1 run | 0.08 | 0.07 | 0.07 | 0.07 | 0.07 | 0.26 | 0.20 | 0.28 |
| | | 10 runs | 0.07 | 0.07 | 0.07 | 0.06 | 0.06 | 0.28 | 0.21 | 0.26 |
| | | 100 runs | 0.08 | 0.07 | 0.07 | 0.06 | 0.07 | 0.30 | 0.26 | 0.28 |
| | | 1000 runs | 0.09 | 0.09 | 0.09 | 0.07 | 0.07 | 0.41 | 0.30 | 0.31 |
| | | 5000 runs | 0.12 | 0.10 | 0.09 | 0.09 | 0.08 | 0.57 | 0.40 | 0.33 |
| | | 10000 runs | 0.14 | 0.13 | 0.12 | 0.11 | 0.10 | 0.77 | 0.52 | 0.38 |
| | | Wear rate ($\mu$m) 10000 runs | 40 | 35 | 32 | 20 | 18 | 420 | 350 | 175 |

Example 29

100 Parts by weight of polyoxymethylene resin (A-1), 25 parts by weight of an inorganic filler (D-1), 2.5 parts by weight of polyolefinic resin composition (B-1), and 0.3 parts by weight of triethyleneglycol-bis-[3-(3-t-butyl-5-methyl-4- hydroxyphenyl)propionate], 0.05 parts by weight of polyamide 66 and 0.2 parts by weight of melamine were uniformly blended by a Henschel mixer and then extrusion-kneaded by a biaxial extruder (L/D=30) set to 200° C. The extruded resin composition was made into pellets by a strand cutter. All the aforementioned properties of moldings made from the pellets were evaluated. Results are shown in Table 9.

Examples 30 to 34

The resin composition was changed to those shown in Table 9, and pellets were made from the resin compositions in the same manner as in Example 29. All the aforementioned properties were evaluated. Results are shown in Table 9.

Example 35

100 Parts by weight of polyoxymethylene resin (A-4), -25 parts by weight of inorganic filler (D-1), 2.5 parts by weight of polyolefinic resin composition (B-1), and 0.3 parts by weight of triethyleneglycol-bis-[3-(3-t-butyl-5-methyl-4-hydroxyphenyl)propionate], 0.05 parts by weight of polyamide 66 and 0.2 parts by weight of melamine as stabilizers were uniformly blended by a Henschel mixer and then extrusion-kneaded by a biaxial extruder (L/D=30) set to 200° C. The extruded resin composition was made into pellets by a strand cutter. All the aforementioned properties of moldings made from the pellets were evaluated. Results are shown in Table 10.

Examples 36 to 42

The resin composition was changed to those shown in Table 10, and pellets were made from the resin compositions in the same manner as in Example 35. All the aforemen-

TABLE 9

| | | | | | Ex. 29 | Ex. 30 | Ex. 31 | Ex. 32 | Ex. 33 | Ex. 34 |
|---|---|---|---|---|---|---|---|---|---|---|
| Composition | (A) | Polyoxymethylene resin | | (A-1) | 100 | 100 | 100 | 100 | 100 | 100 |
| | (B) | Polyolefinic resin composition, | | (B-1) | 2.5 | 2.5 | 2.5 | | | |
| | | etc. | | (B-6) | | | | 2.5 | 2.5 | 2.5 |
| | (C) | Lubricant | | (C-2) | | 2.5 | | | | |
| | | | | (C-3) | | | | | 2.5 | |
| | | | | (C-4) | | | 2.5 | | | 2.5 |
| | (D) | Inorganic filler | | (D-1) | 25 | 25 | 25 | | | |
| | | | | (D-2) | | | | 25 | 25 | 25 |
| Results | Thin-molding peeling | | | | ◯ | ◯ | ◯ | ◯ | ◯ | ◯ |
| | Molding surface appearance | | | | ◯ | ◯ | ◯ | ◯ | ◯ | ◯ |
| | Heat stability | Heat stability at molding, Residence time until silver appearance (min) | | | 45 | 45 | 45 | 45 | 45 | 45 |
| | | Heat-resistant ageing property, Number of days until lowering of tensile elongation to 80% (days) | | | 25 | 30 | 30 | 30 | 30 | 30 |
| | Mechanical properties | Tensile strength (MPa) | | | 58 | 56 | 55 | 53 | 52 | 51 |
| | | Tensile elongation (%) | | | 6 | 6 | 6 | 8 | 8 | 8 |
| | | Bending strength (MPa) | | | 103 | 99 | 98 | 92 | 90 | 88 |
| | | Flexural modulus (GPa) | | | 4.7 | 4.6 | 4.5 | 3.6 | 3.6 | 3.5 |
| | | Izod impact strength (J/m) | | | 36 | 36 | 37 | 38 | 37 | 37 |
| P/D Slidability | Polyoxy-ethylene resin as counter member | Coefficient of friction ($\mu$) | 1 run | | 0.06 | 0.06 | 0.06 | 0.07 | 0.07 | 0.07 |
| | | | 10 runs | | 0.05 | 0.05 | 0.05 | 0.07 | 0.07 | 0.06 |
| | | | 100 runs | | 0.06 | 0.05 | 0.05 | 0.07 | 0.07 | 0.07 |
| | | | 1000 runs | | 0.06 | 0.06 | 0.06 | 0.09 | 0.09 | 0.07 |
| | | | 5000 runs | | 0.07 | 0.07 | 0.07 | 0.10 | 0.10 | 0.08 |
| | | | 10000 runs | | 0.09 | 0.08 | 0.07 | 0.11 | 0.10 | 0.09 |
| | | Wear rate ($\mu$m) 10000 runs | | | 17 | 15 | 15 | 25 | 20 | 16 |
| | Stainless steel as counter member | Coefficient of friction ($\mu$) | 1 run | | 0.07 | 0.06 | 0.06 | 0.07 | 0.07 | 0.07 |
| | | | 10 runs | | 0.07 | 0.07 | 0.05 | 0.07 | 0.07 | 0.07 |
| | | | 100 runs | | 0.07 | 0.07 | 0.05 | 0.08 | 0.07 | 0.07 |
| | | | 1000 runs | | 0.07 | 0.07 | 0.06 | 0.10 | 0.09 | 0.07 |
| | | | 5000 runs | | 0.08 | 0.08 | 0.07 | 0.12 | 0.10 | 0.08 |
| | | | 10000 runs | | 0.09 | 0.08 | 0.07 | 0.14 | 0.12 | 0.10 |
| | | Wear rate ($\mu$m) 10000 runs | | | 6 | 5 | 5 | 14 | 10 | 8 |
| Slidability after solvent washing | Polyoxy-ethylene resin as counter member | Coefficient of friction ($\mu$) | 1 run | | 0.07 | 0.06 | 0.06 | 0.08 | 0.07 | 0.07 |
| | | | 10 runs | | 0.06 | 0.06 | 0.06 | 0.07 | 0.07 | 0.06 |
| | | | 100 runs | | 0.06 | 0.06 | 0.06 | 0.08 | 0.08 | 0.07 |
| | | | 1000 runs | | 0.06 | 0.06 | 0.07 | 0.10 | 0.09 | 0.08 |
| | | | 5000 runs | | 0.08 | 0.07 | 0.07 | 0.11 | 0.10 | 0.08 |
| | | | 10000 runs | | 0.10 | 0.09 | 0.09 | 0.11 | 0.11 | 0.09 |
| | | Wear rate ($\mu$m) 10000 runs | | | 20 | 18 | 17 | 25 | 25 | 18 | tioned properties were evaluated. Results are shown in Table 10.

200° C. The extruded resin composition was made into pellets by a strand cutter. All the aforementioned properties

TABLE 10

|  |  |  |  | Ex. 35 | Ex. 36 | Ex. 37 | Ex. 38 | Ex. 39 | Ex. 40 | Ex. 41 | Ex. 42 |
|---|---|---|---|---|---|---|---|---|---|---|---|
| Composition | (A) | Polyoxymethylene resin | (A-4) | 100 | 100 | 100 | 100 | 100 | 100 | 100 | 100 |
|  | (B) | Polyolefinic resin composition, etc. | (B-1) | 2.5 | 2.5 |  |  |  |  |  |  |
|  |  |  | (B-6) |  |  | 2.5 | 2.5 | 2.5 | 2.5 | 2.5 | 2.5 |
|  | (C) | Lubricant | (C-2) |  | 2.5 |  |  |  | 2.5 |  |  |
|  |  |  | (C-4) |  |  | 2.5 |  |  |  | 2.5 |  |
|  |  |  | (C-5) |  |  |  | 2.5 |  |  |  | 2.5 |
|  | (D) | Inorganic filler | (D-1) | 25 | 25 | 25 | 25 |  |  |  |  |
|  |  |  | (D-2) |  |  |  |  | 25 | 25 | 25 | 25 |
| Results | Thin-molding peeling |  |  | ◎ | ◎ | ◎ | ◎ | ◎ | ◎ | ◎ | ◎ |
|  | Molding surface appearance |  |  | ○ | ○ | ○ | ○ | ○ | ○ | ○ | ○ |
|  | Heat stability | Heat stability at molding, Residence time until silver appearance (min) |  | 95 | 100 | 100 | 100 | 95 | 100 | 100 | 100 |
|  |  | Heat-resistant ageing property, Number of days until lowering of tensile elongation to 80% (days) |  | 50 | 55 | 55 | 55 | 50 | 55 | 55 | 55 |
|  | Mechanical properties | Tensile strength (MPa) |  | 51 | 50 | 50 | 50 | 48 | 47 | 46 | 46 |
|  |  | Tensile elongation (%) |  | 6 | 6 | 6 | 7 | 9 | 10 | 10 | 10 |
|  |  | Bending strength (MPa) |  | 93 | 90 | 90 | 90 | 84 | 82 | 80 | 80 |
|  |  | Flexural modulus (GPa) |  | 4.4 | 4.2 | 4.2 | 4.2 | 3.3 | 3.1 | 3.1 | 3.1 |
|  |  | Izod impact strength (J/m) |  | 39 | 38 | 38 | 38 | 39 | 39 | 40 | 42 |
| P/D Slidability | Polyoxyethylene resin as counter member | Coefficient of friction ($\mu$) | 1 run | 0.07 | 0.07 | 0.07 | 0.07 | 0.07 | 0.07 | 0.07 | 0.07 |
|  |  |  | 10 runs | 0.07 | 0.07 | 0.07 | 0.06 | 0.07 | 0.07 | 0.07 | 0.06 |
|  |  |  | 100 runs | 0.07 | 0.07 | 0.07 | 0.07 | 0.07 | 0.07 | 0.07 | 0.06 |
|  |  |  | 1000 runs | 0.08 | 0.07 | 0.07 | 0.07 | 0.09 | 0.09 | 0.08 | 0.07 |
|  |  |  | 5000 runs | 0.09 | 0.08 | 0.08 | 0.08 | 0.12 | 0.11 | 0.08 | 0.08 |
|  |  |  | 10000 runs | 0.11 | 0.09 | 0.09 | 0.09 | 0.14 | 0.13 | 0.09 | 0.09 |
|  |  | Wear rate ($\mu$m) 10000 runs |  | 30 | 25 | 25 | 25 | 40 | 35 | 30 | 30 |
|  | Stainless steel as counter member | Coefficient of friction ($\mu$) | 1 run | 0.07 | 0.06 | 0.06 | 0.06 | 0.08 | 0.08 | 0.08 | 0.08 |
|  |  |  | 10 runs | 0.07 | 0.06 | 0.06 | 0.06 | 0.08 | 0.08 | 0.08 | 0.08 |
|  |  |  | 100 runs | 0.08 | 0.07 | 0.07 | 0.07 | 0.08 | 0.08 | 0.08 | 0.08 |
|  |  |  | 1000 runs | 0.09 | 0.07 | 0.07 | 0.07 | 0.11 | 0.11 | 0.10 | 0.10 |
|  |  |  | 5000 runs | 0.12 | 0.09 | 0.08 | 0.09 | 0.15 | 0.13 | 0.13 | 0.12 |
|  |  |  | 10000 runs | 0.13 | 0.10 | 0.10 | 0.10 | 0.17 | 0.15 | 0.15 | 0.14 |
|  |  | Wear rate ($\mu$m) 10000 runs |  | 15 | 10 | 10 | 10 | 25 | 20 | 20 | 20 |
| Slidability after solvent washing | Polyoxyethylene resin as counter member | Coefficient of friction ($\mu$) | 1 run | 0.08 | 0.07 | 0.07 | 0.07 | 0.08 | 0.08 | 0.07 | 0.07 |
|  |  |  | 10 runs | 0.07 | 0.07 | 0.06 | 0.06 | 0.07 | 0.07 | 0.07 | 0.06 |
|  |  |  | 100 runs | 0.07 | 0.07 | 0.07 | 0.07 | 0.07 | 0.07 | 0.07 | 0.06 |
|  |  |  | 1000 runs | 0.08 | 0.07 | 0.07 | 0.07 | 0.09 | 0.09 | 0.08 | 0.07 |
|  |  |  | 5000 runs | 0.09 | 0.08 | 0.08 | 0.08 | 0.12 | 0.11 | 0.08 | 0.08 |
|  |  |  | 10000 runs | 0.11 | 0.09 | 0.09 | 0.09 | 0.14 | 0.13 | 0.09 | 0.09 |
|  |  | Wear rate ($\mu$m) 10000 runs |  | 30 | 25 | 25 | 25 | 40 | 35 | 30 | 30 |

Example 43

100 Parts by weight of polyoxymethylene resin (A-1), 10 parts by weight of inorganic filler (D-3), 3 parts by weight of polyolefinic resin composition (B-1), and 0.3 parts by weight of triethyleneglycol-bis-[3-(3-t-butyl-5-methyl-4-hydroxyphenyl)propionate], 0.05 parts by weight of polyamide 66 and 0.2 parts by weight of melamine as stabilizers were uniformly blended by a Henschel mixer and then extrusion-kneaded by a biaxial extruder (L/D=30) set to of moldings made from the pellets were evaluated. Results are shown in Table 11.

Examples 44 and 45 and Comparative Examples 23 to 26

The resin composition was changed to those shown in Table 11, and pellets were made from the resin compositions in the same manner as in Example 43. All the aforementioned properties were evaluated. Results are shown in Table 11.

TABLE 11

|  |  |  |  | Ex. 43 | Ex. 44 | Ex. 45 | Comp. Ex. 23 | Comp. Ex. 24 | Comp. Ex. 25 | Comp. Ex. 26 |
|---|---|---|---|---|---|---|---|---|---|---|
| Composition | (A) | Polyoxymethylene resin | (A-1) | 100 | 100 | 100 | 100 | 100 | 100 | 100 |
|  | (B) | Polyolefinic resin composition, etc. | (B-1) | 3 | 3 | 3 |  |  |  |  |
|  |  |  | (B-7) |  |  |  |  |  | 1.5 |  |
|  |  |  | (B-8) |  |  |  |  |  |  | 3 |

TABLE 11-continued

|  |  |  |  |  | Ex. 43 | Ex. 44 | Ex. 45 | Comp. Ex. 23 | Comp. Ex. 24 | Comp. Ex. 25 | Comp. Ex. 26 |
|---|---|---|---|---|---|---|---|---|---|---|---|
|  | (C) | Lubricant |  | (C-2) |  | 2.5 | 2.5 | 2.5 | 2.5 |  |  |
|  |  |  |  | (C-4) |  |  | 1.5 |  |  |  |  |
|  | (D) | Inorganic filler |  | (D-3) | 10 | 10 | 10 | 10 | 10 | 10 | 10 |
|  | (E) | Others |  | (E-2) |  |  |  |  | 2.5 |  |  |
| Results | Thin-molding peeling |  |  |  | ○ | ○ | ○ | ○ | ○ | X | X |
|  | Molding surface appearance |  |  |  | ○ | ○ | ○ | ○ | Δ | XX | X |
|  | Heat stability | Heat stability at molding, Residence time until silver appearance (min) |  |  | 100 | 105 | 105 | 95 | 100 | 90 | 100 |
|  |  | Heat-resistant ageing property, Number of days until lowering of tensile elongation to 80% (days) |  |  | 30 | 30 | 35 | 35 | 35 | 35 | 35 |
|  | Mechanical properties | Tensile strength (MPa) |  |  | 58 | 57 | 55 | 58 | 57 | 57 | 56 |
|  |  | Tensile elongation (%) |  |  | 6 | 6 | 7 | 6 | 5 | 6 | 6 |
|  |  | Bending strength (MPa) |  |  | 98 | 96 | 94 | 98 | 97 | 96 | 94 |
|  |  | Flexural modulus (GPa) |  |  | 4.8 | 4.7 | 4.6 | 4.8 | 4.7 | 4.7 | 4.6 |
|  |  | Izod impact strength (J/m) |  |  | 36 | 36 | 37 | 35 | 34 | 36 | 36 |
| P/D Slidability | Polyoxy- ethylene resin as counter member | Coefficient of friction ($\mu$) | 1 run |  | 0.06 | 0.06 | 0.05 | 0.28 | 0.14 | 0.07 | 0.07 |
|  |  |  | 10 runs |  | 0.05 | 0.05 | 0.05 | 0.86 | 0.15 | 0.08 | 0.08 |
|  |  |  | 100 runs |  | 0.05 | 0.05 | 0.05 | 0.30 | 0.15 | 0.14 | 0.11 |
|  |  |  | 1000 runs |  | 0.06 | 0.06 | 0.06 | 0.40 | 0.18 | 0.34 | 0.18 |
|  |  |  | 5000 runs |  | 0.08 | 0.08 | 0.07 | 0.51 | 0.20 | 0.43 | 0.20 |
|  |  |  | 10000 runs |  | 0.11 | 0.11 | 0.09 | 0.60 | 0.22 | 0.51 | 0.24 |
|  |  | Wear rate ($\mu$m) 10000 runs |  |  | 20 | 19 | 12 | 320 | 75 | 260 | 85 |
|  | Stain- less steel as counter member | Coefficient of friction ($\mu$) | 1 run |  | 0.06 | 0.06 | 0.06 | 0.13 | 0.13 | 0.08 | 0.08 |
|  |  |  | 10 runs |  | 0.07 | 0.06 | 0.06 | 0.13 | 0.13 | 0.12 | 0.09 |
|  |  |  | 100 runs |  | 0.07 | 0.07 | 0.06 | 0.13 | 0.13 | 0.18 | 0.16 |
|  |  |  | 1000 runs |  | 0.09 | 0.07 | 0.07 | 0.16 | 0.16 | 0.28 | 0.20 |
|  |  |  | 5000 runs |  | 0.11 | 0.09 | 0.08 | 0.19 | 0.18 | 0.38 | 0.25 |
|  |  |  | 10000 runs |  | 0.14 | 0.11 | 0.10 | 0.25 | 0.24 | 0.47 | 0.30 |
|  |  | Wear rate ($\mu$m) 10000 runs |  |  | 18 | 14 | 10 | 70 | 55 | 280 | 140 |
| Slidability after solvent washing | Polyoxy- ethylene resin as counter member | Coefficient of friction ($\mu$) | 1 run |  | 0.07 | 0.06 | 0.06 |  | 0.22 | 0.21 | 0.15 |
|  |  |  | 10 runs |  | 0.06 | 0.06 | 0.06 |  | 0.19 | 0.19 | 0.18 |
|  |  |  | 100 runs |  | 0.06 | 0.05 | 0.06 |  | 0.20 | 0.23 | 0.21 |
|  |  |  | 1000 runs |  | 0.06 | 0.07 | 0.07 |  | 0.21 | 0.36 | 0.23 |
|  |  |  | 5000 runs |  | 0.09 | 0.09 | 0.08 |  | 0.23 | 0.45 | 0.28 |
|  |  |  | 10000 runs |  | 0.12 | 0.11 | 0.09 |  | 0.26 | 0.53 | 0.33 |
|  |  | Wear rate ($\mu$m) 10000 runs |  |  | 25 | 20 | 15 |  | 100 | 280 | 135 |

Example 46

A 40-mm biaxial extruder (L/D=42; cylinder temperature set to 200° C.) with two side feed inlets was used, and a uniform blend of polyoxymethylene resin (A-2) and 0.3 parts by weight of triethyleneglycol-bis-[3-(3-t-butyl-5-methyl-4-hydroxyphenyl)propionate], 0.05 parts by weight of polyamide 66 and 0.2 parts by weight of melamine as stabilizers, prepared by a Henschel mixer was fed thereto from the main feeder at 100 kg/hr, while feeding an inorganic filler (D-4) thereto from the first side feed inlet at 32.5 kg/hr and polyolefinic resin composition (B-1) thereto from the second feed inlet at 3 kg/hr, thereby conducting melt kneading. The extruded resin composition was made into pellets by a strand cutter. All the aforementioned properties of moldings made from the pellets were evaluated. Results are shown in Table 12.

Examples 47 and 48 and Comparative Examples 27 to 29

The resin composition and feed positions for the components were changed to those shown in Table 12, and pellets were made from the resin compositions in the same manner as in Example 46. All the aforementioned properties were evaluated. Results are shown in Table 12.

TABLE 12

|  |  |  |  | Feed position | Ex. 46 | Ex. 47 | Ex. 48 | Comp. Ex. 29 | Comp. Ex. 30 | Comp. Ex. 31 |
|---|---|---|---|---|---|---|---|---|---|---|
| Composition | (A) | Polyoxymethylene resin | (A-2) | Main | 100 | 100 | 100 | 100 | 100 | 100 |
|  |  |  | (A-2) | Main |  |  |  |  |  |  |
|  | (B) | Polyolefinic resin composition, etc. | (B-1) | Second side | 3 | 3 | 3 |  |  |  |
|  |  |  | (B-7) | Second side |  |  |  |  | 1.5 |  |
|  |  |  | (B-8) | Second side |  |  |  |  |  | 3 |
|  | (C) | Lubricant | (C-3) | Second side |  | 2.5 |  |  |  |  |
|  |  |  | (C-4) | Second side |  |  | 2.5 |  |  |  |
|  | (D) | Inorganic filler | (D-4) | First side | 32.5 | 32.5 | 32.5 | 32.5 | 32.5 | 32.5 |

TABLE 12-continued

| | | Feed position | Ex. 46 | Ex. 47 | Ex. 48 | Comp. Ex. 29 | Comp. Ex. 30 | Comp. Ex. 31 |
|---|---|---|---|---|---|---|---|---|
| Results | Thin-molding peeling | | ○ | ○ | ○ | ○ | X | X |
| | Molding surface appearance | | ○ | ○ | ○ | Δ | XX | X |
| Heat stability | Heat stability at molding, Residence time until silver appearance (min) | | 75 | 80 | 80 | 60 | 65 | 70 |
| | Heat-resistant ageing property, Number of days until lowering of tensile elongation to 80% (days) | | 25 | 30 | 30 | 30 | 20 | 25 |
| Mechanical properties | Tensile strength (MPa) | | 124 | 122 | 118 | 128 | 122 | 118 |
| | Tensile elongation (%) | | 4 | 4 | 4 | 4 | 4 | 4 |
| | Bending strength (MPa) | | 188 | 184 | 178 | 198 | 158 | 178 |
| | Flexural modulus (GPa) | | 8.2 | 8.1 | 8.1 | 8.4 | 7.8 | 8.1 |
| | Izod impact strength (J/m) | | 75 | 77 | 78 | 78 | 70 | 70 |
| P/D Slidability | Polyoxyethylene resin as counter member | Coefficient of friction ($\mu$) | 1 run | 0.20 | 0.20 | 0.18 | 0.33 | 0.25 | 0.20 |
| | | | 10 runs | 0.25 | 0.22 | 0.19 | 0.40 | 0.35 | 0.26 |
| | | | 100 runs | 0.30 | 0.28 | 0.22 | 0.48 | 0.46 | 0.40 |
| | | | 1000 runs | 0.32 | 0.30 | 0.25 | 0.57 | 0.57 | 0.51 |
| | | | 5000 runs | 0.35 | 0.33 | 0.28 | 0.58 | 0.58 | 0.54 |
| | | | 10000 runs | 0.38 | 0.38 | 0.30 | 0.60 | 0.61 | 0.57 |
| | | Wear rate ($\mu$m) | 10000 runs | 270 | 180 | 150 | 460 | 450 | 380 |
| | Stainless steel as counter member | Coefficient of friction ($\mu$) | 1 run | 0.13 | 0.13 | 0.13 | 0.17 | 0.13 | 0.14 |
| | | | 10 runs | 0.15 | 0.13 | 0.13 | 0.19 | 0.15 | 0.16 |
| | | | 100 runs | 0.20 | 0.15 | 0.15 | 0.30 | 0.28 | 0.28 |
| | | | 1000 runs | 0.26 | 0.22 | 0.22 | 0.36 | 0.35 | 0.33 |
| | | | 5000 runs | 0.30 | 0.26 | 0.24 | 0.43 | 0.44 | 0.40 |
| | | | 10000 runs | 0.35 | 0.31 | 0.26 | 0.50 | 0.52 | 0.46 |
| | | Wear rate ($\mu$m) | 10000 runs | 45 | 35 | 25 | 85 | 80 | 70 |
| Slidability after solvent washing | Polyoxyethylene resin as counter member | Coefficient of friction ($\mu$) | 1 run | 0.23 | 0.22 | 0.20 | | 0.31 | 0.28 |
| | | | 10 runs | 0.26 | 0.23 | 0.20 | | 0.39 | 0.28 |
| | | | 100 runs | 0.31 | 0.28 | 0.23 | | 0.48 | 0.42 |
| | | | 1000 runs | 0.33 | 0.30 | 0.25 | | 0.57 | 0.52 |
| | | | 5000 runs | 0.35 | 0.33 | 0.28 | | 0.61 | 0.55 |
| | | | 10000 runs | 0.38 | 0.38 | 0.32 | | 0.64 | 0.59 |
| | | Wear rate ($\mu$) | 10000 runs | 280 | 190 | 160 | | 490 | 400 |

INDUSTRIAL APPLICABILITY

As compared with the conventional resin compositions, the present polyoxymethylene resin composition is a resin composition having a distinguished slidability (low coefficient of friction and low wear rate), when molded, while maintaining the heat stability of polyoxymethylene resins and furthermore a considerably improved thin-molding peeling insusceptibility and which is capable of preventing deterioration of slidability due to contact with a solvent for dry cleaning, etc. Thus, the present invention can provide new materials for use in electric and electronic components which have been recently under increasing size reduction and also for use as buckles, fasteners, clips, etc.

Specific uses include components for OA appliances, typically printers and copiers; components for video appliances, typically VTR (Video Tape Recorder) and video movies; components for music, image and information appliances, typically cassette players, LD (Laser Disk), MD (Mini Disk), CD (Compact Disk) including CD-ROM (Read Only Memory), CD-R (Recordable) and CD-RW (Rewritable), DVD (Digital Video Disk) including DVD-ROM, DVD-R, DVD-RAM (Random Access Memory) and DVD-Audio, navigation systems and mobile computers; components for communication appliances, typically portable telephones and facsimiles; components for automobile interior and exterior furnishings; industrial sundry components, typically disposable cameras, toys, fasteners, conveyers, buckles, clips and housing equipment. Components for use in the aforementioned appliances include, for example, mechanical working components such as gears, cams, sliders, levers, arms, clutches, joints, shafts, bearings, key stems, key tops, etc.; outsert chassis resin components; chassis, trays, side plates, etc.

What is claimed is:

1. A polyoxymethylene resin composition, which comprises a polyoxymethylene resin (A), a silicone compound-grafted polyolefinic resin (B-1) and a silicone compound (B-2), the amount of the silicone compound-grafted polyolefinic resin (B1) being 0.05 to 10 parts by weight on the basis of 100 parts by weight of the polyoxymethylene resin (A), and the ratio of (B1)/(B2) by weight in the composition being 99/1 to 70/30.

2. A polyoxymethylene resin composition, which comprises a polyoxymethylene resin (A) and a polyolefinic resin composition (B) comprising a silicone compound-grafted polyolefinic resin (B1), obtained by a grafting reaction of a polyolefinic resin with a silicone compound in a graft ratio of the silicone compound to the polyolefinic resin of 95 to 30% by weight, and a silicone compound (B2), the amount of the silicone compound-grafted polyolefinic resin (B1) being 0.05 to 10 parts by weight on the basis of 100 parts by weight of the polyoxymethylene resin (A), and the ratio of (B1)/(B2) by weight in the composition being 99/1 to 70/30.

3. The polyoxymethylene resin composition according to any one of claims 1 or 2, wherein 0.05 to 5 parts by weight of a lubricant (C) selected from the group consisting of alcohols, fatty acids, esters of alcohols with fatty acids, esters of alcohols with discarboxylic acids, polyoxyalkylene glycols and olefin compounds having an average degree of polymerization of 10 to 500, and/or 0.5 to 100 parts by weight of an inorganic filler (D) are further included on the basis of 100 parts by weight of the polyoxymethylene resin (A).

4. The polyoxymethylene resin composition according to claim 3, wherein the inorganic filler is at least one member selected from fibrous, granular, plate-shaped and hollow fillers.

5. The polyoxymethylene resin composition according to claim 2, wherein in the grafting reaction of the polyolefinic resin with the silicone compound the ratio of the polyolefinic resin to the silicone compound by weight is in the range of 80/20 to 20/80.

6. The polyoxymethylene resin composition according to claim 1 or 2, wherein the polyolefinic resin is at least one resin selected from low density polyethylene, linear low density polyethylene, ethylene-vinyl acetate copolymer, ethylene-methyl methacrylate copolymer and ethylene-ethyl acrylate copolymer.

7. A molding formed from the polyoxymethylene resin composition according to claim 1 or 2.

8. The molding according to claim 7, wherein the molding is at least one component selected from the group consisting of a working part, a resinous part for a chassis obtained by outsert molding, a chassis, a tray and a side plate.

9. The molding according to claim 8, wherein the mechanical working component is at least one component selected from the group consisting of gears, cams, sliders, levers, arms, clutches, joints, shafts, bearings, key stems and key tops.

10. The molding according to claim 7, wherein the molding is a component for OA appliances.

11. The molding according to claim 7, wherein the molding is a component for video appliances.

12. The molding according to claim 7, wherein the molding is a component for music, image and information appliances.

13. The molding according to claim 7, wherein the molding is a component for communication appliances.

14. The molding according to claim 7, wherein the molding is a component for automobile interior and exterior furnishings.

15. The molding according to claim 7, wherein the molding comprises a component for industrial goods.

* * * * *